(12) United States Patent  (10) Patent No.: US 7,734,996 B2
Hirata  (45) Date of Patent: Jun. 8, 2010

(54) DOCUMENTATION BROWSING METHOD, DOCUMENTATION BROWSING APPARATUS, DOCUMENTATION BROWSING ROBOT, AND DOCUMENTATION BROWSING PROGRAM

(75) Inventor: Kyoji Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 794 days.

(21) Appl. No.: 10/570,755

(22) PCT Filed: Aug. 31, 2004

(86) PCT No.: PCT/JP2004/012513
§ 371 (c)(1),
(2), (4) Date: Mar. 7, 2006

(87) PCT Pub. No.: WO2005/027092
PCT Pub. Date: Mar. 24, 2005

(65) Prior Publication Data
US 2006/0294453 A1 Dec. 28, 2006

(30) Foreign Application Priority Data
Sep. 8, 2003 (JP) ............................. 2003-315215

(51) Int. Cl.
*G06N 3/00* (2006.01)
(52) U.S. Cl. ..................................................... 715/201
(58) Field of Classification Search .................. 715/200, 715/201, 234, 243, 254
See application file for complete search history.

(56) References Cited
U.S. PATENT DOCUMENTS
2001/0031136 A1* 10/2001 Kawamura et al. ............ 386/98
(Continued)

FOREIGN PATENT DOCUMENTS
EP  1 016 985  7/2000
(Continued)

OTHER PUBLICATIONS
Tsunoda et al. "Automatic Alignment between TV news and newspaper articles by maximum length string matching between captions and articles texts" Sep. 12, 1996; pp. 75-82.
(Continued)

*Primary Examiner*—Kyle R Stork
(74) *Attorney, Agent, or Firm*—Whitham Curtis Christofferson & Cook, PC

(57) ABSTRACT

To enable a person to effectively create a document based on image data or audio data of a recorded meeting or a recorded lecture and also a person who creates the minutes of a meeting or a participant to browse a summarized document with images or voices so that a plurality of persons can effectively perform documentation.

The audio/image inputting means 10 generates image data by recording a meeting and audio data by recording the contents of the meeting. The document inputting means 20 generates document data including a drafted minutes of a meeting or the like inputted by a person who creates the minutes of a meeting. The relationship deriving means 50 generates correspondence table data by deriving relationship between voices or images and a document based on audio data or image data and document data. The relationship presenting means 60 displays voices or images and a document in association with each other based on the correspondence table data.

47 Claims, 16 Drawing Sheets

U.S. PATENT DOCUMENTS

| | | |
|---|---|---|
| 2002/0099552 A1* | 7/2002 | Rubin et al. ................. 704/270 |
| 2003/0063136 A1* | 4/2003 | J'maev ....................... 345/864 |
| 2004/0083109 A1* | 4/2004 | Halonen et al. ............. 704/277 |

FOREIGN PATENT DOCUMENTS

| | | |
|---|---|---|
| JP | 8-194492 | 7/1996 |
| JP | 8-314494 | 11/1996 |
| JP | 2000-112931 | 4/2000 |
| JP | 2000-235585 | 8/2000 |
| JP | 2002-268667 | 9/2002 |
| JP | 2002-344636 | 11/2002 |
| JP | 2003-186491 | 7/2003 |

OTHER PUBLICATIONS

The transactions of the institute of electronics, information and communication engineers, vol. J79-D-II No. 5; 1996.

Journal of Japanese Society for Artificial Intelligence, vol. 12 No. 6; 1997.

Miura et al. Information Processing Society of Japan, pp. 3-31; Mar. 13, 2001.

* cited by examiner

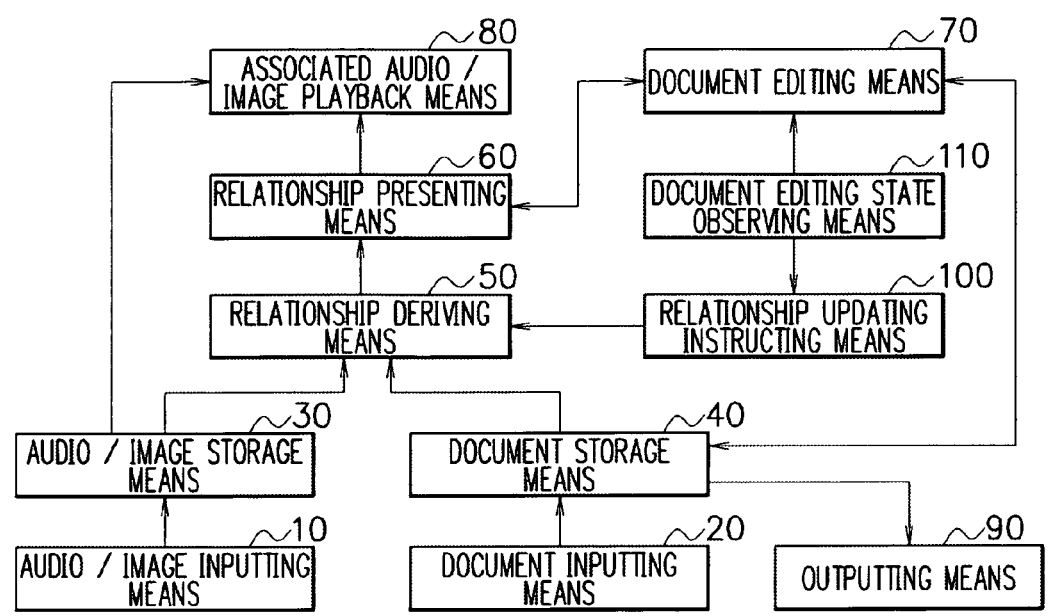
F I G. 1

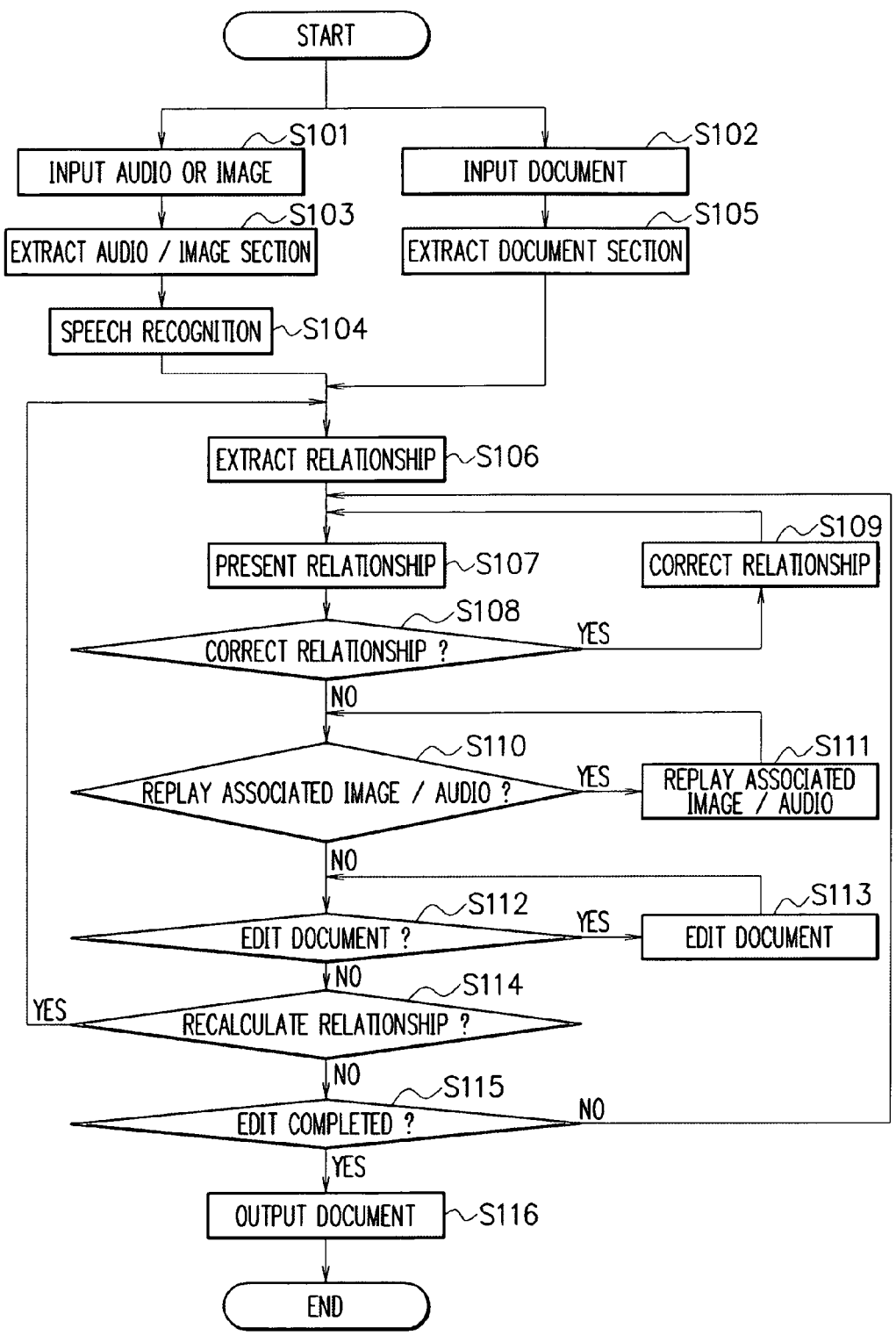
F I G. 2

F I G. 5
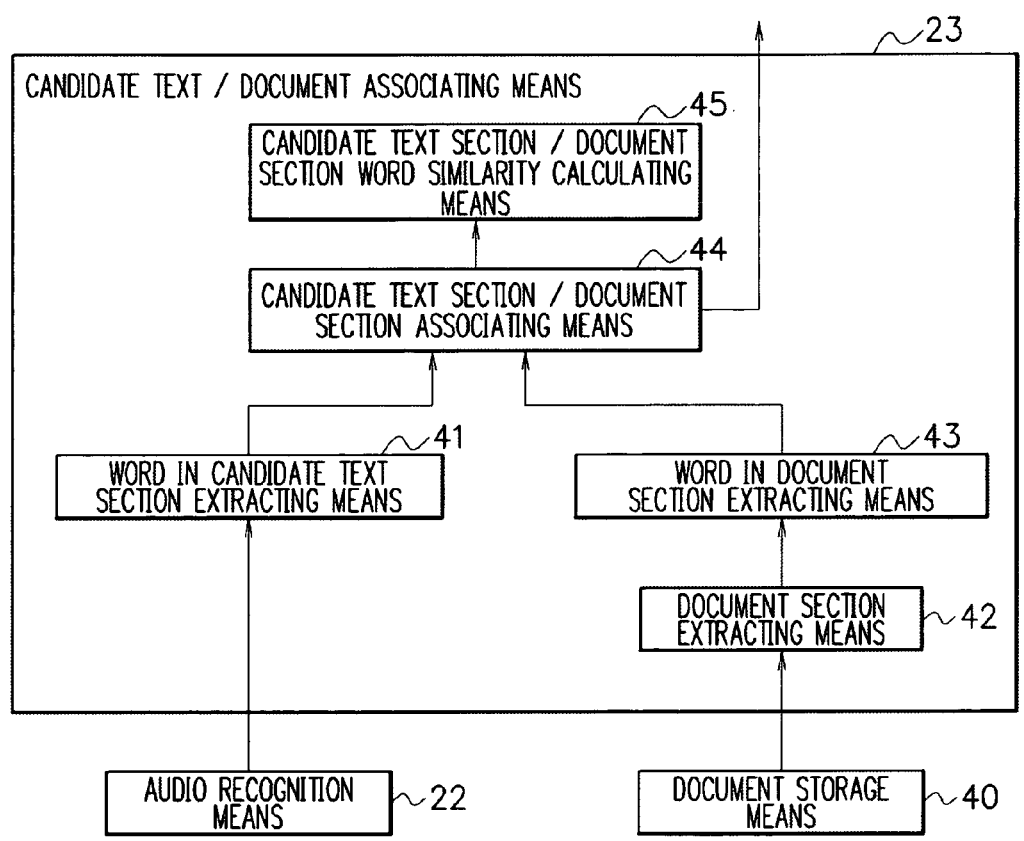

F I G. 10
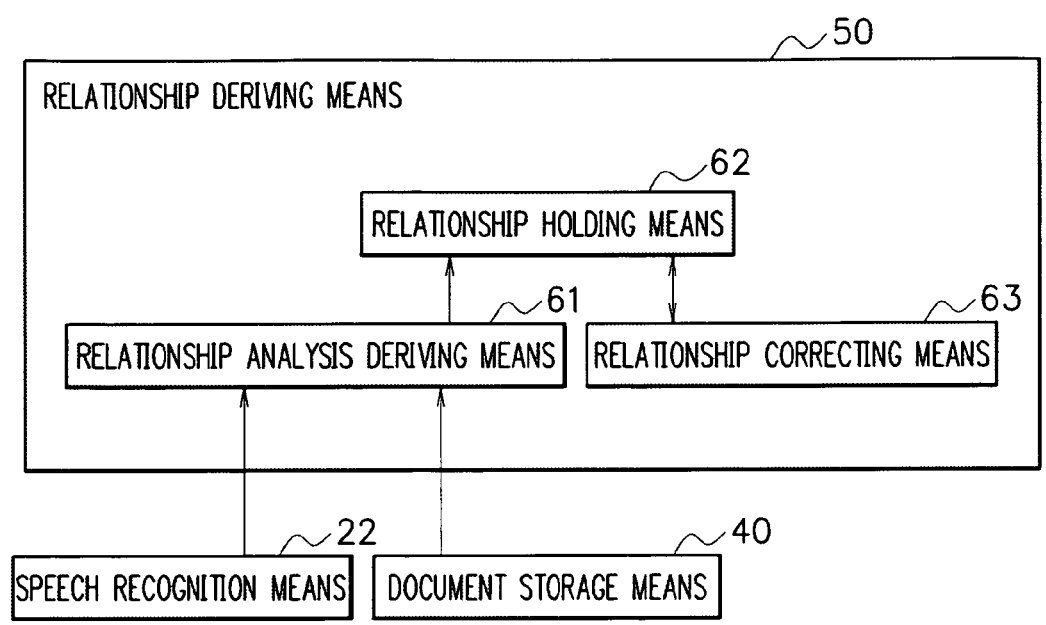

F I G. 15

| DOCUMENT | SPEECH OF AUDIO RECOGNITION |
|---|---|
| THE MINUTES OF A MEETING GENERATING APPARATUS IS ... | THE MINUTES OF A MEETING GENERATING APPARATUS IS ... |
| | THEREFORE, ... — 1501 |
| MANY METHODS HAVE BEEN STUDIED AS A FIELD OF APPLICATION. AMONG THEM, ... | MANY METHODS ... BE STUDIED AS A FIELD OF APPLICATION IN THE FUTURE STUDY ... |
| CONNECTED WITH BUSINESS ... | |

FIG. 16

| DOCUMENT | BASE WORDS |
|---|---|
| THE MINUTES OF A MEETING GENERATING APPARATUS IS ... | MINUTES OF A MEETING GENERATING APPARATUS RELATIONSHIP |
|  | SPEECH RECOGNITION |
| MANY METHODS HAVE BEEN STUDIED AS A FIELD OF APPLICATION. AMONG THEM, ... | MINUTES OF A MEETING MINUTES OF A LECTURE CONGRESS |
| CONNECTED WITH BUSINESS... |  |

DOCUMENTATION BROWSING METHOD, DOCUMENTATION BROWSING APPARATUS, DOCUMENTATION BROWSING ROBOT, AND DOCUMENTATION BROWSING PROGRAM

TECHNICAL FIELD

The present invention generally relates to a technique of using multi-media, and more specifically to a documentation browsing method, documentation browsing apparatus, a documentation browsing robot and a documentation browsing program, which enable a user to create and browse a document by associating audio data or image data of a recorded meeting or a lecture with a created document in order to create a document on the meeting or the lecture.

BACKGROUND ART

Scenes or audio of a meeting or a lecture may be recorded with apparatus such as a video recorder or a tape recorder so that documentation of minutes of the meeting or the lecture may be supported. In such a case, documentation is done based on the recorded image or audio. A person who creates the minutes of a meeting/a lecture needs to create the minutes by playing and watching the image or listening to the audio after the meeting or the lecture. That requires the person who creates the minutes of a meeting or a lecture to create the minutes of the meeting or the lecture by repeatedly referring to the image or the audio spending time as much as or longer than the time of the meeting or the lecture. Accordingly, that requires much workload of the person.

As a technique for creating or supporting to create the minutes of a meeting or the like, the Patent Document 1 describes an apparatus for supporting to create the minutes of a meeting which alleviates a burden of a person who creates the minutes of a meeting by specifying a range of audio to be played back for enabling playback when the person makes text memorandum from audio memorandum recording remarks of those at in the meeting. The apparatus for supporting to create the minutes of a meeting described in the Patent Document 1 includes playback means for playing back sounds or voices that participants in a predetermined range can hear. Documentation means of the apparatus for helping create the minutes of a meeting creates text memorandum based on the played back audio memorandum and structures the text memorandum according to specification. Displaying means of the apparatus for helping create the minutes of a meeting displays the structured text memorandum.

The Patent Document 2 describes an intelligent meeting support system for enabling automatic creation of the minutes of a meeting without requiring any burden to participants. In the intelligent meeting support system described in the Patent Document 2, an apparatus for creating the minutes of a meeting converts audio text data into sentences including Chinese characters by performing semantic analysis based on the basic audio data outputted from an audio collecting device. Then, the apparatus for creating the minutes of a meeting creates the minutes of a meeting based on the converted sentences.

The Patent Document 3 describes a system for automatically creating the minutes of a meeting which can automatically creates the minutes of the meeting in real time and automatically send the minutes of the meeting just after the meeting. In the system for automatically creating the minutes of a meeting described in the Patent Document 3, the apparatus for creating the minutes of a meeting automatically creates a document based on image information or audio information by using speech recognition technique. In order to create the minutes of a meeting, an operator such as an MC divides audio meeting information for appropriate sections and inputs a keyword for each section at the same time so that accuracy of speech recognition is improved and audio data for each section defined by the operator is converted into text data and the minute of the meeting is created.

Patent Document 1: Japanese Patent Laid-Open Publication No. 8-194492 (pp. 4-6, FIGS. 1-3)

Patent Document 2: Japanese Patent Laid-Open Publication No. 2000-112931 (pp. 3-9, FIGS. 1-3)

Patent Document 3: Japanese Patent Laid-Open Publication No. 2002-344636 (pp. 3-5, FIG. 1)

DISCLOSURE OF THE INVENTION

The apparatus for supporting to create the minutes of a meeting described in the Patent Document 1 avoids blocking the meeting as a play back range is specified and audio memorandum is played back large enough to reach predetermined participants. If the content of the audio memorandum is unclear during preparation of the minutes of a meeting, the participants can review the content and correctly create sentences from the remarks so that they can quickly create high quality minutes of the meeting with clear relationship between remarks. However the apparatus still requires the person who creates the minutes of a meeting to create the minutes of the meeting by repeatedly referring to the recorded audio of the meeting. That is still a heavy burden to the person who creates the minutes of a meeting.

The intelligent meeting support system described in the Patent Document 2 or the system for automatically creating the minutes of a meeting described in the Patent Document 3 can reduce the burden to the person who creates the minutes of the meeting by automatically creating the minutes of the meeting. However, since the systems depend on speech recognition for creating a text, if the speech recognition is not accurate enough, the created text may be erroneous. Then users must work out the errors into understandable expressions, resulting in higher cost for creating a document. Particularly, as recording conditions are poor in a big conference hall or a big lecture hall, the systems have a problem in accuracy of recognizing sounds or voices.

For a debate or the like in the Diet or a city assembly, the minutes of a meeting are usually created closely to the remarks. In contrast, for a meeting held in a private company, the minutes of a meeting are usually created with only the remarks which are meaningful to participants and summarized instead of recording the proceeding or all the remarks of the participants. In such a case, it is not enough to create the minutes of a meeting just by converting audio data into text data with speech recognition. That is to say, it is difficult to automate generation of compact minutes of a meeting/lecture including summary as the systems cannot choose meaningful parts only by using the automatic recognizing techniques.

Operation to summarize only meaningful parts for the participants may require all the participants to review the summarized contents. In such a case, it is difficult for each participant to determine which items of a proceeding or remarks should be chosen just by reading the generated document by speech recognition. Therefore, the document may be not corrected.

In order to improve accuracy of the speech recognition, a sophisticated microphone may be used to collect voices. However that requires a user to set an input device/analysis device independently for each speaker, which increases the size of the entire system, and results in cost increase.

Therefore, the present invention aims to solve the above mentioned problems, and intends to provide a documentation browsing method, a documentation browsing apparatus, a documentation browsing robot and a documentation browsing program, which can effectively create a document based on the recorded image data or audio data of a meeting or a lecture, and enable a person who creates a document or participants to read the summarized document with images or voices so that a plurality of persons can effectively create a document.

The present invention intends to provide a documentation browsing method, a documentation browsing apparatus, a documentation browsing robot and a documentation browsing program, which can create a document at a low price by enabling a person to edit or add a document which was created based on the memorandum of a participant during the meeting or the lecture, without requiring a skill of a stenographer and superfluous costs at the Diet or a lecture of a celebrity.

The present invention intends to provide a documentation browsing method, a documentation browsing apparatus, a documentation browsing robot and a documentation browsing program, which allow a user not only to create and browse the minute of a meeting which is a faithful production of the remarks in a meeting or a lecture but also to create and browse a document which summarizes the content of the meeting or the lecture for user's confirmation.

Further, the present invention intends to provide a documentation browsing method, a documentation browsing apparatus, a documentation browsing robot and a documentation browsing program, which allow a user to create and browse a document by using speech recognition even if the speech recognition is not accurate enough.

A documentation browsing method according to the present invention includes the steps of: generating correspondence between voices or images included in audio data or image data and documents included in document data; displaying the voices or the images included in audio data or image data and the document included in document data associated with each other based on the correspondence; and updating document data associated with the displayed document.

The documentation browsing method may also include the steps of: dividing voices or images included in audio data or image data and a document included in document data into predetermined sections and generating correspondence between voices or images and a document for each section; and generating, adding, correcting or deleting a document for each section. Such a configuration enables a user to select and edit only a section which the user wants to correct in the entire document. Accordingly, the documentation browsing method can streamline user's work to create a document.

The documentation browsing method may also include the steps of: establishing a matching between a document and voices or images by matching text generated by speech recognition or image recognition and a document included in document data; and generating correspondence based on the established matching. Such a configuration enables words or phonemes to be extracted and compared and relationship between a document and voices or images to be extracted.

The documentation browsing method may also include the steps of: extracting a basic word to be a basic unit for matching text and a document from words included in each section of text and a document; calculating and comparing similarities between groups of the basic words, which are sets of the extracted basic words, and establishing a matching between a document and voices or images; and generating correspondence based on the established matching. Such a configuration can complement the accuracy of speech recognition even when a lecture hall has poor conditions for collecting sound, and can reduce the size of the entire system or cost of equipment.

Documentation browsing apparatus according to the present invention is characterized in that it includes: correspondence generating means for generating correspondence between voices or images included in audio data or image data and a document included in document data; association displaying means for displaying the voices or the images included in audio data or image data and the document included in document data associated with each other based on the correspondence; and document updating means for updating document data associated with a document displayed on the displaying means.

The correspondence generating means may divide voices or images included in audio data or image data and a document included in document data into predetermined sections and generate correspondence between voices or images and a document for each section; and document updating means may generate, add, correct or delete a document for each section. Such a configuration enables a user to select and edit only a section which the user wants to correct in the entire document. Accordingly, the means can streamline user's work to create a document.

The documentation browsing apparatus includes playback means for playing back voices or images, wherein the correspondence generating means may divide voices or images included in audio data or image data and a document included in document data into predetermined sections and generate correspondence between voices or images with a document for each section; and document updating means may generate, add, correct or delete a document for each section; and playback means may playback voices or images of a part associated with at least one section included in document data among sounds or images included in audio data or image data. Such a configuration enables a user to select only sounds or images of a section which the user wants to check in the contents of the document and playback the audio or the image to check the contents. Accordingly, the document browsing apparatus can streamline user's work to create a document.

In the document browsing apparatus, the document data may include a document of the minutes of a meeting or a lecture or a lesson, and the audio data or the image data may include voices or images of recorded contents of the meeting, the lecture or the lesson. Such a configuration can streamline documentation of the minutes of a meeting, a lecture or a lesson.

The correspondence generating means may extract a starting time and an ending time of a section of voices or images and generate association information which associates the starting time with the ending time and document data. Such a configuration can display and present the starting time and the ending time of the voices or the images and the document associated with each other to the user based on the association information.

The relationship displaying means may display time information which indicates the elapsed time of voices or images associating to each section of document data. Such a configuration can visually present the elapsed time of the voices or the images to the user.

The relationship displaying means may also display a displaying location of a document included in document data on a display screen in association with time information which indicates an elapsed time of voices or images. Such a configuration can visually present the elapsed time of voices or images in association with an associated document to the user.

The association displaying means may display the length of displaying each section of document data on a display screen by a length in proportion to the playback time of the voices or the images associated with each section. Such a configuration enables a user to intuitively recognize and understand the time spent for each item in a meeting or the like.

The association displaying means may display the length of each section of document data on a display screen by a predetermined length. Such a configuration enables a user to intuitively understand the number of sections of the voices, the number of sections of the image or the document, or the number of all sections.

The association displaying means may display the length of each section of document data on a display screen by a length in proportion to the amount of documents in documents associated with each section. Such a configuration can increase display density for displaying a document. Such a configuration also enables a user to browse or create a document totally compact.

The documentation browsing apparatus may include display type selection means for selecting a type of displaying the length of each section of document data on a display screen, wherein the display type selection means may select a display type of a length in proportion to the playback time of the audio or the image associated with each section, or a predetermined length, or a length in proportion to the amount of documents in documents associated with each section according to a user's selecting instruction; and the association displaying means may display each section according to the display type selected by the display type selection means. Such a configuration enables a user to freely select the display type of a document according to the usage of the document and effectively perform the documentation.

The association displaying means may display a time length of voices or images by a length of a display bar indicating a time axis on a display screen, and display the time length of voices or images and characters in a document of a section associated with the voices or the images in the same color. Such a configuration facilitates a user to visually recognize relationship between voices or images and a document for each section.

The documentation browsing apparatus may include mismatch detecting means for detecting the case where voices or images and a document is not associated with each other as mismatch state of the audio or the image and the document, and mismatch displaying means for displaying that the audio or the image and the document mismatch when the mismatch is detected, wherein the mismatch displaying means may display that no section of documents associated with a section of voices or images exists or that no section of voices or images associated with a section of the document exists as a mismatch state. Such a configuration enables a user to correctly recognize relationship between voices or images and a document even when a part of voices or images with no associated document is included or when a part of a document with no associated document is included.

The documentation browsing apparatus may include matching means for establishing a matching between a document and voices or images, wherein the correspondence generating means may generate correspondence based on the extracted established matching.

The documentation browsing apparatus may include document storage means for storing document data and audio and image storage means for storing audio data or image data. Such a configuration can temporarily accumulate storage data of a meeting or a lecture and create a document of the minutes of a meeting or a lecture afterward.

The matching means may establish a matching between a document and voices or images by matching text generated by speech recognition or image recognition and a document included in document data. Such a configuration can extract relationship between a document and voices or images by extracting and comparing a word or a phoneme.

The matching means may match text and a document by using a dynamic program matching system with a word appearing in text or a document. Such a configuration can associate voices or images with a document by performing effective calculation reusing the calculated result of relationship.

The association displaying means may display text associated with a document among texts generated by the matching means in addition to a document included in the document data. Such a configuration facilitates a user to easily recognize the contents of a meeting which is not described even when a part with no description of a document associated with voices or images is included.

The documentation browsing apparatus may include basic word extracting means for extracting a basic word to be a basic unit for matching text and a document from words included in each section of text and a document, wherein the matching means may establish a matching between a document and voices or images by calculating and comparing similarities between groups of basic words, which are sets of the basic words extracted by the basic word extracting means. Such a configuration can complement accuracy of speech recognition and reduce the size of the entire system and cost of equipment even when a lecture hall has poor conditions for collecting sound.

The matching means may match text and a document by using a dynamic program matching system based on a group of basic words including basic words extracted by the basic word extracting means. Such a configuration can associate voices or images with a document by performing effective calculation reusing the calculated result of relationship based on the basic words.

The association displaying means may display a basic word associated with a document among basic words extracted by the basic word extracting means in addition to a document included in the document data. Such a configuration enables a user to immediately recognize the contents described in each section.

The matching means may include relationship correction means for correcting the extracted relationship according to user's operation. Such a configuration enables a user to perform effective documentation by correcting relationship even when erroneous relationship between voices or images and a document is presented.

The documentation browsing apparatus may include relationship recalculation instruction means for outputting recalculation instruction information for instructing recalculation of relationship between a document and voices or images and cause the matching means to recalculate relationship. Such a configuration can recalculate relationship between voices or images and a document and present the result to a user when the document is edited and updated.

The documentation browsing apparatus may include document update determination means for determining whether the document updating means updates document data or not; wherein the relationship recalculation instruction means may output recalculation instruction information and cause the relationship extraction means to recalculate relationship when the document data is determined to be updated. Such a configuration can detect that a document is updated, calculate relationship between voices or images and the document and present the result to a user.

The documentation browsing apparatus may include outputting means for outputting a document based on document data. Such a configuration can print and output a document such as the completed minutes of a meeting or a lecture.

A documentation browsing robot according to the present invention is characterized by having documentation browsing apparatus.

A documentation browsing program according to the present invention is characterized by causing a computer to execute the process of: generating correspondence between voices or images included in audio data or image data and a document included in document data; displaying the audio or the image included in audio data or image data and the document included in document data associated with each other based on the correspondence; and updating document data associated with the displayed document.

The documentation browsing program may also cause a computer to execute the process of: dividing voices or images included in audio data or image data and a document included in document data for predetermined sections and generating correspondence between voices or images with a document for each section; and generating, adding, correcting or deleting a document for each section. Such a configuration enables a user to select and edit only a section which the user wants to correct in the entire document. Accordingly, the documentation browsing program can streamline work for the user to create a document.

The documentation browsing program may also cause a computer to execute the process of: divide voices or images included in audio data or image data and a document included in document data into predetermined sections and generate correspondence between voices or images and a document for each section; and generate, add, correct or delete a document for each section; and playback voices or images of a part associated with at least one section included in document data among audio or images included in audio data or image data. Such a configuration enables a user to select only voices or images of a section where the user wants to check the contents of the document and playback the audio or the image to check the contents. Accordingly, the document browsing program can streamline user's work to create a document.

The document browsing program may also cause a computer to execute the process based on document data including a document of the minutes of a meeting or a lecture or a lesson, and the audio data or the image data including voices or images of recorded contents of the meeting, the lecture or the lesson. Such a configuration can streamline documentation of the minutes of a meeting, a lecture or a lesson.

The document browsing program may also cause a computer to execute the process of: extracting a starting time and an ending time of a section of voices or images and generating association information which associates the starting time and the ending time with document data. Such a configuration can display and present the starting time and the ending time of the voices or the images and the starting time and the ending time of the document associated with each other to the user based on the association information.

The document browsing program may also cause a computer to execute the process of displaying time information which indicates elapsed time of voices or images associated to each section of document data. Such a configuration can visually present elapsed time of the voices or the images to the user.

The document browsing program may also cause a computer to execute the process of displaying a displaying location of a document included in document data on a display screen in association with time information which indicates an elapsed time of voices or images. Such a configuration can visually present the elapsed time of voices or images in association with an associated document to the user.

The document browsing program may also cause a computer to execute the process of displaying the length of each section of a document data on a display screen by the length in proportion to the playback time of the voices or the images associated with each section. Such a configuration enables a user to intuitively recognize and understand the time spent for each item in a meeting or the like.

The document browsing program may also cause a computer to execute the process of displaying the length of displaying each section of document data on a display screen by a predetermined length. Such a configuration enables a user to intuitively understand the number of sections of the voices, the image or the document displayed on the screen or the number of all sections.

The document browsing program may cause a computer to execute the process of displaying the length of each section of document data on a display screen by the length in proportion to the amount of documents in documents associated with each section. Such a configuration can improve display density for displaying a document. The configuration also enables a user to browse or create a document totally compact.

The document browsing program may also cause a computer to execute the process of: selecting a display type as display type of a length of document data on a display screen of each section from displaying a length in proportion to the playback time of the audio or the image associated with each section, or a predetermined length, or a length in proportion to the amount of documents associated with each section according to a user's indication; and displaying each section according to the selected display type. Such a configuration enables a user to freely select the display type of a document according to the usage of the document and effectively perform the documentation.

The document browsing program may cause a computer to execute the process of displaying a time length of voices or images by a length of a display bar indicating a time axis on a display screen, and displaying the time length of voices or images and characters in a document of a section associating the voices or the images in the same color. Such a configuration facilitates a user to visually recognize relationship between voices or images and a document for each section.

The document browsing program may cause a computer to execute the process of detecting the case where voices or images and a document is not associated with each other as a mismatch state of the audio or the image and the document, and displaying that no section of documents associated with a section of voices or images exists or that no section of voices or images associated with a section of the document exists as a mismatch state when the mismatch is detected. Such a configuration enables a user to correctly recognize relationship between voices or images and a document even when a part of voices or images with no associated document is included or when a part of a document with no associated voices or images is included.

The document browsing program may cause a computer to execute the process of establishing a matching between a document and voices or images, and generating correspondence based on the extracted matching.

The document browsing program may cause a computer to execute the process of causing document storage means for storing document data to store document data generated based on a document inputted by a user; and causing audio and image storage means for storing audio data or image data to store audio data or image data generated with recorded dialogs. Such a configuration can temporarily accumulate storage data of a meeting or a lecture and create a document of the minutes of a meeting or a lecture after the meeting or the lecture.

The document browsing program may cause a computer to execute the process of extracting association of a document and voices or images by matching text generated by speech recognition or image recognition and a document included in document data. Such a configuration can extract relationship between a document and voices or images by extracting and comparing words or phonemes.

The document browsing program may cause a computer to execute the process of matching text and a document by using a dynamic program matching system with words appearing in text or a document. Such a configuration can associate voices or images with a document by performing effective calculation reusing the calculated result of association.

The document browsing program may cause a computer to execute the process of displaying text associated with a document in generated text in addition to the document included in the document data. Such a configuration facilitates a user to easily recognize the contents of the meeting which is not described even when a part with no description of a document associated with voices or images is included.

The document browsing program may cause a computer to execute the process of extracting a basic word to be a basic unit for matching text and a document from words included in each section of the text and the document, and establishing a matching between a document and voices or images by calculating and comparing similarities between groups of the basic words, which are sets of the extracted basic words. Such a configuration can complement accuracy of speech recognition and reduce the size of the entire system or cost of equipment even when a lecture hall has poor conditions for collecting sound.

The document browsing program may cause a computer to execute the process of matching text and a document by using a dynamic program matching system based on a group of the basic words including extracted basic words. Such a configuration can associate voices or images with a document by performing effective calculation reusing the calculated result of relationship based on the basic words.

The document browsing program may cause a computer to execute the process of displaying a basic word associated with the document among extracted basic words in addition to a document included in the document data. Such a configuration enables a user to immediately recognize the contents described in each section.

The document browsing program may cause a computer to execute the process of correcting the extracted relationship according to user's operation. Such a configuration enables a user to perform effective documentation by correcting relationship even when erroneous relationship between voices or images and a document is presented.

The document browsing program may cause a computer to execute the process of outputting recalculation instruction information for instructing recalculation of relationship between a document and voices or images and recalculating the relationship. Such a configuration can recalculate relationship between voices or images and a document and present the result to a user when the document is edited and updated.

The document browsing program may cause a computer to execute the process of determining whether document data is updated or not and outputting recalculation instruction information and recalculating relationship when the document data is determined to be updated. Such a configuration can detect that a document is updated, calculate relationship between voices or images and the document and present the result to a user.

The document browsing program may cause a computer to execute the process of outputting a document based on document data. Such a configuration can print and output a document such as the completed minutes of a meeting or a lecture.

According to the present invention, the documentation browsing method, the documentation browsing apparatus, the documentation browsing robot and the documentation browsing program are adapted to display voices or images and a document associated with each other based on generated correspondence and updating document data associating the displayed document. Therefore, the present invention can streamline user's documentation as the user can edit a document by the user checking a display screen and playing back only voices or images of a particular place required for documentation without playing back the entire voices or images. If a plurality of users creates a document, each of the users can easily playback and browse grounds for creating the document or voices or images associated with a particular place. Accordingly, all the users can immediately recognize the contents of the document. That can streamline documentation which is performed by a plurality of users. Therefore, the present invention can effectively create a document based on image information or audio information of a recorded meeting or a recorded lecture. With the present invention, persons who create a document or participants can browse a summarized document with images or voices and a plurality of persons can effectively perform documentation.

BRIEF DESCRIPTION OF THE DRAWINGS

FIG. 1 is a block diagram showing an example of an arrangement of documentation browsing apparatus according to an embodiment;

FIG. 2 is a flowchart showing an example of the minutes of a meeting creating process and the minutes of a meeting browsing process;

FIG. 5 is a block diagram showing an example of an arrangement of the candidate text/document associating means 23;

FIG. 10 is a block diagram showing another example of an arrangement of the relationship deriving means 50;

FIG. 15 is an illustration showing another example of a relationship display screen between voices/images and a document;

FIG. 16 is an illustration showing yet another example of a relationship display screen between voices/images and a document;

Figure 3:
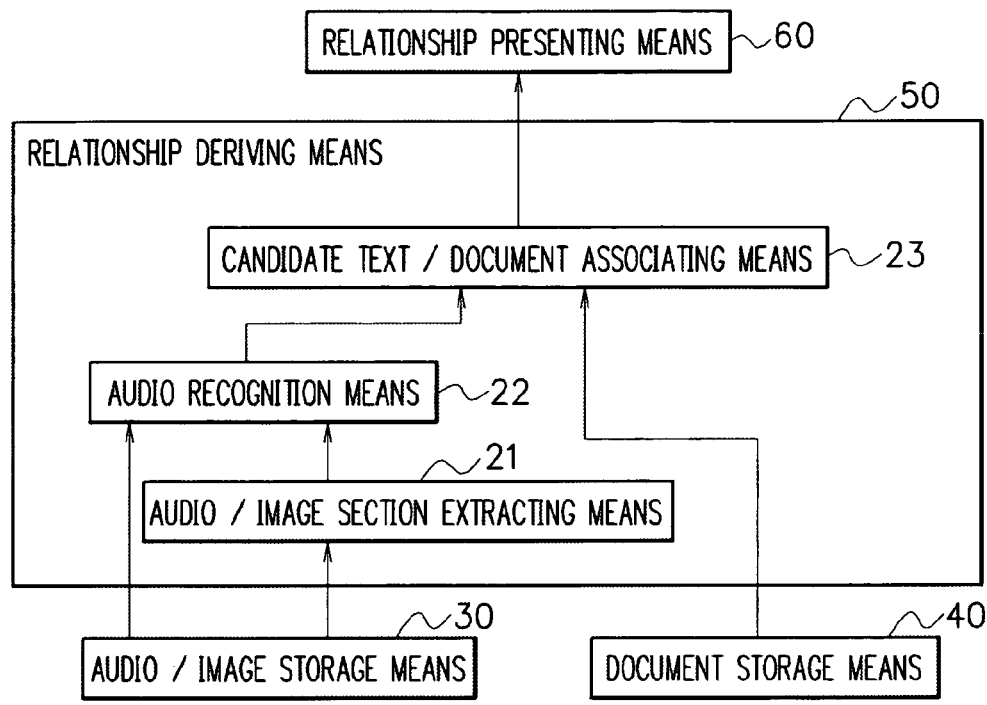
FIG. 3 is a block diagram showing an example of an arrangement of the relationship deriving means 50.

DESCRIPTION OF SYMBOLS 10 audio/image inputting means
20 document inputting means
21 audio/image section extracting means
22 speech recognition means
23 candidate text/document association means
30 audio/image storage means
31 frequency analysis unit
32 phoneme recognition unit
33 word/document recognition unit
3 phoneme template dictionary
35 dictionary/language model accumulating unit
40 document storage means
41 word in candidate text section extracting means
42 document section extracting means
43 word in document section extracting means
44 candidate text section/document section associating means
45 candidate text section/document section word similarity calculating means
50 relationship deriving means
51 presenting type selecting means
52 individual relationship presenting means
53 association presenting means
60 relationship presenting means
61 relationship analysis deriving means
62 relationship holding means
63 relationship correcting means
70 document editing means
80 associated audio/image playback means
81 inconformity detecting means
82 inconformity presenting means
90 outputting means
100 relationship updating instructing means
110 document editing state observing means

BEST MODE FOR CARRYING OUT THE INVENTION

Embodiment 1

An embodiment of the present invention will be described with reference to drawings. FIG. 1 is a block diagram showing an example of an arrangement of a documentation browsing apparatus according to the present invention. As shown in FIG. 1, the documentation browsing apparatus includes audio/image inputting means 10 for inputting voices or images, document inputting means 20 for inputting documents, audio/image storage means 30 for storing audio data or image data, document storage means 40 for storing document data, relationship deriving means 50 for deriving relationship between voices or images and documents, relationship presenting means 60 for displaying and presenting relationship between voices or images and documents, associated audio/image playback means 80 for playing back voices or images, document editing means 70 for editing document data, outputting means 90 for outputting documents, relationship updating instructing means 100 for instructing reevaluation of relationship, and document editing state observing means 110 for monitoring a state of document edition.

In this embodiment, an example where a person who participated a meeting creates the minutes of the meeting (proceeding) as a document by using the documentation browsing apparatus will be described. The documentation browsing apparatus cannot only be adapted to create the minutes of a meeting but also to create a document in general circumstances including a lecture or a lesson.

The audio/image inputting means 10 is realized by an image inputting device such as a video camera, an audio inputting device such as a microphone and an information processing unit such as a computer. The audio/image inputting means 10 generates image data by recording an image of an event such as a meeting, which is an object of documentation (in this example, creating proceeding), and generates audio data by recording voices in a meeting. In creating the minutes of a meeting according to the embodiment, an example where one or more video cameras for taking a picture of meeting scenes are set and an audio recorder working in conjunction with a tape recorder or a microphone is set on a desk in a meeting room will be described.

The document inputting means 20 is realized by a text inputting device including a keyboard, a pen inputting device or a scanner, and an information processing unit such as a computer. The document inputting means 20 accepts an input of a document which describes a target event such as a meeting. For example, the document inputting means 20 accepts an input of a first article of the minutes of a meeting (proceeding) which is created based on a memorandum made by other participants of the meeting according to an operation of the person who creates the minutes of the meeting. The document inputting means 20 generates document data based on an inputted document.

In this embodiment, a keyboard for creating the minutes of a meeting, a scanner or an OCR (Optical Character Reader) for reading and recording the minutes of a meeting created on a sheet of paper is set in a meeting room as the document inputting means 20. As document inputting means 20, an inputting device for reading a document created by another word processor may also be set.

The audio/image storage means 30 is a recording medium such as RAM (Random Access Memory), flash memory or a hard disk. The audio/image storage means 30 stores audio data or image data generated by the audio/image inputting means 10. The document storage means 40 is a recording medium such as RAM, flash memory or a hard disk. The document storage means 40 stores document data generated by the document inputting means 20. The document storage means 40 also stores document data edited and updated by the document editing means 70.

The relationship deriving means 50 compares audio data or image data stored by the audio/image storage means 30 and document data stored by the document storage means 40, and derives relationship between a segment from voices or images and a segment from documents. For example, the relationship deriving means 50 derives relationship indicating the segment included in documents which is associated with a segment in voices or images.

The relationship presenting means 60 displays the relationship between voices/images and a document derived by the relationship deriving means 50 on a display unit (not shown) and presents it to a person who creates a document or a participant of a meeting. The associated audio/image playback means 80 plays back voices or images associated with a particular place of a document according to a playback instruction from a participant of a meeting who checked relationship presented by the relationship presenting means 60. The relationship deriving means 50, the relationship presenting means 60 and the associated audio/image playback means 80 are realized, for example, by an information processing unit such as a computer.

The document editing means 70 updates document data stored by the document storage means 40 by creating, deleting or correcting the document. For example, a person who drafts the minutes of a meeting completes the minutes by checking relationship presented by the relationship presenting means 60 and updating the minutes as operating the document editing means 70 to enlarge/correct the self made minutes, or by collecting opinions from respective participants who checked the relationship and operating the document editing means 70 and updating document data stored by the document storage means 40 based on the collected opinion.

The document editing means 70 is an information processing terminal such as a personal computer. The document editing means 70 may be present for each of the participants of a meeting. In such a case, each participant may correct the minutes of a meeting by checking relationship presented by the relationship presenting means 60 and operating a terminal by himself/herself and updating document data stored by the document storage means 40.

The outputting means 90 outputs a document based on document data stored in the document storage means 40. For example, the outputting means 90 is realized by an outputting device such as a printer and an information processing unit such as a computer, and outputs the minutes of a meeting based on document data stored by the document storage means 40.

The relationship updating instructing means 100 reevaluates relationship between voices or images and documents when document data is updated. A user may directly give an instruction to the relationship updating indicating means 100. The document editing state observing means 110 monitors a document editing state or the like and detects whether document data is updated or not. The relationship updating instructing means 100 and the document editing state observing means 110 are realized by an information processing unit such as a computer.

Audio and image generating means is realized by the audio/image inputting means 10. Document generating means is realized by the document inputting means 20. Relationship information generating means 60 and matching means are realized by the relationship deriving means 50. Association displaying means is realized by the relationship presenting means 60. Document updating means is realized by the document editing means 70. Playback means is realized by the associated audio/image playback means 80. Relationship recalculation instructing means is realized by the relationship updating instructing means 100. Document update determining means is realized by the document editing state observing means 110.

An arrangement of the embodiment can be realized by software. For example, a storage device (not shown) of an information processing unit which realizes a documentation browsing apparatus stores a documentation browsing program for causing a computer to execute the process of: generating audio data or image data by recording the contents of dialogue, generating document data based on a document inputted by a user, generating correspondence between voices or images included in audio data or image data with documents included in document data, displaying voices or images included in audio data or image data and documents included in document data associated with each other based on correspondence, and updating document data associated with the displayed document.

Now, operation will be described. FIG. 2 is a flowchart showing an example of the minutes creating process for creating the minutes of a meeting according to operation by a person who creates the minutes of a meeting and the minutes browsing process for a participant of a meeting or the like to browse the created minutes of a meeting. In the embodiment, in advance one of the participants has taken on a role of a person who creates the minutes of a meeting. Alternatively, nay one of the participants may create the minutes.

The audio/image inputting means 10 shoots scenes of a meeting and records sounds or voices and generates image data and audio data (step S101). The audio/image inputting means 10 causes the audio/image storage means 30 to store the generated image data and audio data.

A person creates the minutes of a meeting based on a memorandum which is created by himself/herself during the meeting or by another participant. Then, the person who creates the minutes of the meeting operates the document inputting means 20 and inputs the created minutes of the meeting. The document inputting means 20 accepts the input of the minutes of a meeting and generates document data according to the operation by the person (step S102). The document inputting means 20 causes the document storage means 40 to store the generated document data.

The relationship deriving means 50 extracts audio data or image data from the audio/image storage means 30 and extracts document data from the document storage means 40. The relationship deriving means 50 derives relationship between a section in voices or images and a section in documents based on the extracted audio data or the extracted image data and the extracted document data.

FIG. 3 is a block diagram showing an example of an arrangement of the relationship deriving means 50. As shown in FIG. 3, the relationship deriving means 50 includes audio/image section extracting means 21 for dividing voices or images into sections, speech recognition means 22 for generating a text line by performing speech recognition, and candidate text/document associating means 23 for associating the text line generated by the speech recognition means 22 and document data. In the embodiment, a case of dividing audio into sections based on audio data and deriving its relationship with the document will be described.

The relationship deriving means 50 may divide voices or voices into sections based on audio data included in an audio track in image data, instead of dividing sounds or voices into sections based on audio data of the direct record of a meeting, to establish an association by performing speech recognition. Hereinafter, the audio data of the direct record of a meeting will be merely referred to as input audio data. Audio data included in an audio track in image data will be referred to as track audio data.

The audio/image section extracting means 21 divides voices or images into sections based on audio data or image data stored by the audio/image storage means 30 (step S103). In the embodiment, each of the divided sections is called audio section or image section. In this example, the audio/image section extracting means 21 extracts an audio section based on input audio data or track audio data.

In order to derive relationship based on audio data, the audio/image section extracting means 21 extracts an audio section based on audio data stored by the audio/image storage means 30. For example, the audio/image section extracting means 21 extracts an audio section by dividing voices included in audio data at each silent section.

In order to derive relationship based on image data, the audio/image section extracting means 21 extracts an image section based on image data stored by the audio/image storage means 30. For example, the audio/image section extracting means 21 extracts an image section by using switching point information in scenes.

The audio/image section extracting means 21 may extract a section without regard for the contents of voices or images, merely extracting a section for each five minutes or ten minutes.

The speech recognition means 22 performs speech recognition based on section information of voices or images from the audio/image section extracting means 21 (in this example, audio section information) and audio data stored by the audio/image storage means 30 (inputted audio data) or track audio data included in image data, converts voices of a meeting into text and generates a text line. Hereinafter, a text line generated by the speech recognition means 22 will be referred to as candidate text.

Figure 4:
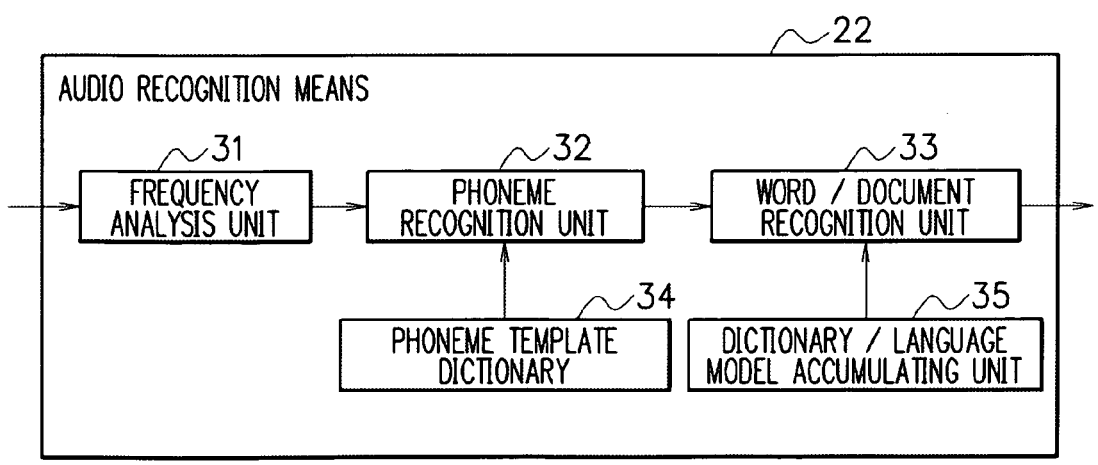
FIG. 4 is a block diagram showing an example of an arrangement of the speech recognition means 22.

As a speech recognition system, generally many approaches have been proposed. FIG. 4 is a block diagram showing an example of an arrangement of the speech recognition means 22. As shown in FIG. 4, the speech recognition means 22 includes frequency analysis unit 31 for analyzing frequencies of audio data, a phoneme recognition unit 32 for converting audio data into phoneme data, a word/document recognition unit 33 for converting phoneme data into word data or document data, a phoneme template 34 for accumulating representative data of a phoneme, and a dictionary/language model accumulating unit 35 for accumulating information on words or language models.

The frequency analysis unit 31 generates acoustic characteristic quantity which is quantitative data of a multidimensional vector converted from frequency-analyzed audio data. The frequency analysis unit 31 generates as acoustic characteristic quantity, for example, quantitative data of cepstrum or normalized logarithm power converted from audio data. The frequency analysis unit 31 generates as acoustic characteristic quantity, for example, quantitative data of the first or the second derivative of cepstrum or normalized logarithm power based on audio data.

The phoneme template dictionary 34 previously stores representative data such as cepstrum of each phoneme as a template. Hereinafter, data stored by the phoneme template dictionary 34 as a template will be referred to as a phoneme template. The phoneme recognition unit 32 compares the acoustic characteristic quantity generated by the frequency analysis unit 31 and each phoneme template stored by the phoneme template dictionary 34 and converts inputted voices into phoneme data. In such a case, the phoneme recognition unit 32 converts inputted voices into phoneme data in the inputted order according to a time line and outputs the phoneme data.

The dictionary/language model accumulating unit 35 previously stores beforehand information on relationship between a word and a phoneme in each language and information on appearance probability in each state in a document. The "appearance probability in each state" means an expectancy indicating a degree of probability of a word appearing in a dialog in a meeting for a certain agenda or an expectancy of a phoneme expected to appear behind a specific word from a grammatical point of view. For example, if probability that a post positional particle or an auxiliary verb is grammatically expected to appear behind a certain word is high, the dictionary/language model accumulating unit 35 stores information on high appearance probability of a phoneme associated with the post positional particle or the auxiliary verb.

The word/document recognition unit 33 determines whether word data stored by the dictionary/language model accumulating unit 35 includes the data that matches a phoneme line included in phoneme data generated by the phoneme recognition unit 32. The word/document recognition unit 33 converts a phoneme line included in phoneme data generated by the phoneme recognition unit 32 into a word or a document based on a degree of matching with the word data stored in the dictionary/language model accumulating unit 35, appearance probabilities in the current state, or the like. For example, the word/document recognition unit 33 converts phoneme sequences into a word such as post positional particles or auxiliary verbs in preference to other words when it is determined that probability of using a post positional particle or an auxiliary verb is high based on appearance probabilities even if the voices are unclear. For example, if the word/document recognition unit 33 determines based on an appearance probability or the like that participant's name was likely indicated, it converts phoneme sequences into a character string of the participant's name in preference to other words.

The word/document recognition unit 33 generates text data including the converted words or a converted document as candidate texts (step S104).

Although an example of performing speech recognition by phoneme, speech recognition may be performed with a word-based template instead of phoneme data. A template may be converted according to a speaker. Any type of speech recognition may be used. For example, the phoneme template dictionary 34 may previously store a phoneme template of male voice and a phoneme template of female voice. In such a case, the speech recognition means 22 may identify whether it is a male voice or a female voice to perform speech recognition by using either a phoneme template of male voice or a phoneme template of female voice. It may also use a phoneme template of child voice or a phoneme template of adult voice. It may also prepare a phoneme template for a particular person.

The candidate text/document associating means 23 associates a candidate text for each audio/image section generated by the audio/image section extracting means 21 with document data extracted from the document storage means 40, and derives the relationship.

FIG. 5 is a block diagram showing an example of an arrangement of the candidate text/document associating means 23. As shown in FIG. 5, the candidate text/document associating means 23 includes word-within-candidate-text section extracting means 41 for extracting a predetermined word from a candidate text, document section extracting means 42 for dividing a document into sections with arbitrary length based on document data, word-within-document section extracting means 43 for extracting a predetermined word from document data, candidate text section/document section associating means 44 for associating voices/images with a document, and word-similarity-within-candidate-text section/document section calculating means 45 for calculating similarity of respective words. The basic word extracting means is realized by means 41 and means 43.

The means 41 extracts one or more words included in each audio/image section from a candidate text corresponding to the section.

The document section extracting means 42 divides a document included in document data extracted from the document storage means 40 for an arbitrary length (step S105). In this embodiment, each of the divided sections is called document section. For example, the document section extracting means 42 extracts a document section by using line feed information or null line information in a document. For example, the document section extracting means 42 may extract a document section by using structural information in a document such as a chapter heading.

The document section extracting means 42 may extract a document section by using the analyzed result of a word used in a document. For example, if a document is created for news and words in a document change from words relating to sports including "baseball, homerun, complete games" to words relating to politics and economics including "business, Prime Minister, tax cut", the document section extracting means 42 determines that the topic changed. In such a case, the document section extracting means 42 performs for example, vector conversion on appearance frequency of a word extracted by a word frequency analysis in each line of a document, and detects as a topic converting point a point where the vector value changed significantly and extracts a section divided at topic converting points as a document section.

The word in document section extracting means 43 extracts one or more words included in a document for each document. The candidate text section/document section associating means 44 compares a set of words extracted by the 41 and a set of words extracted by the means 43, associates each audio/image section with a document section and outputs the result. That is to say, the words extracted by means 41 and the means 43 play a role of basic words to be a basic unit for matching a candidate text and a document. The means 44 matches the candidate text and the document by comparing respective sets of words and associates each audio/image section with a document section.

The candidate text section/document section word similarity calculating means 45 calculates a distance in a section between each audio/image section and each document section and calculates a similarity of words included in each section.

The means 44 associates each audio/image section with a document section based on the similarity calculated by the means 45 and derives relationship between voices/images and a document (step S106).

Figure 6:
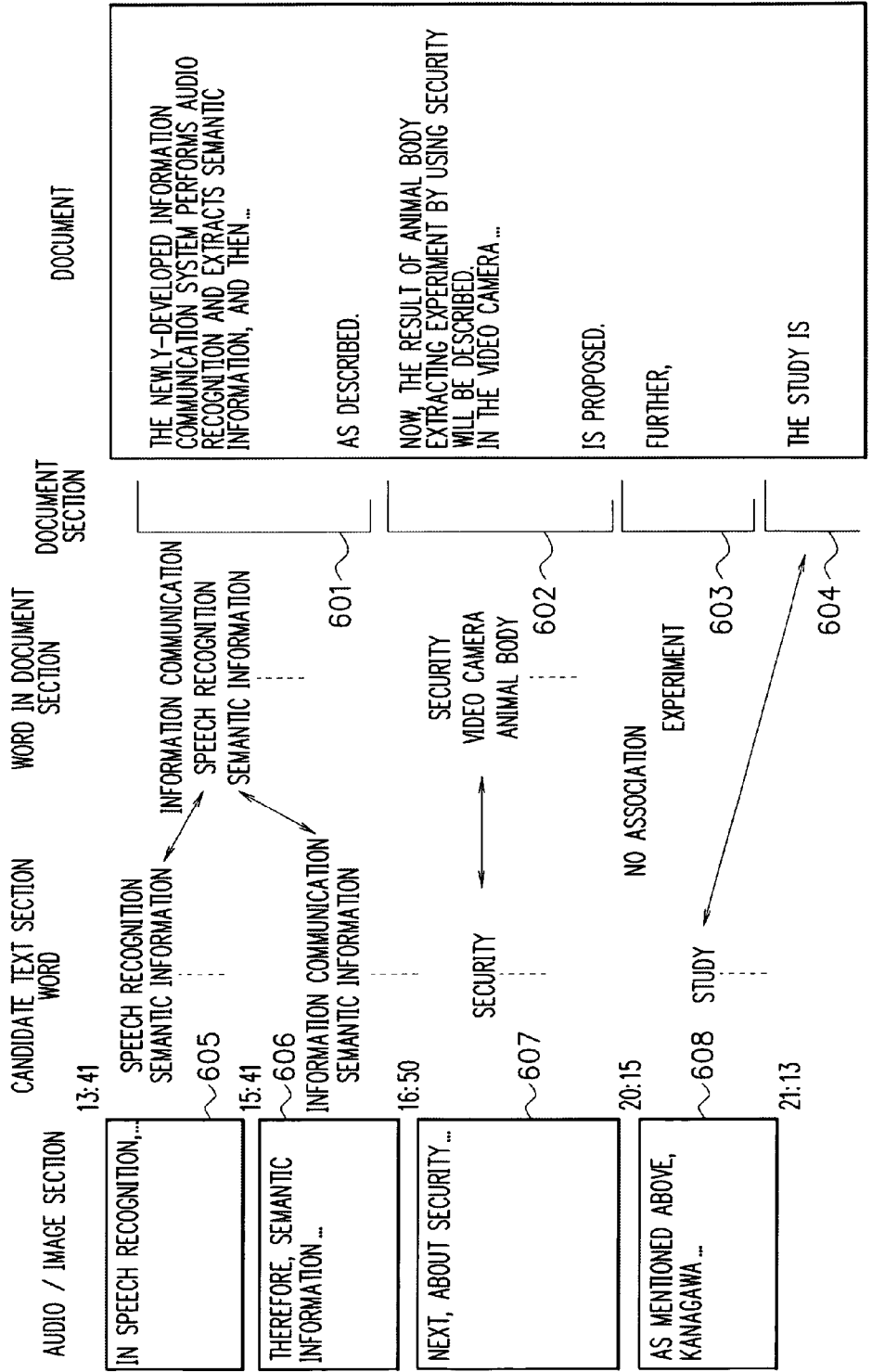
FIG. 6 is an illustration schematically showing operation of the process of associating sections performed by the candidate text/document associating means 23.

FIG. 6 is an illustration schematically showing operation of the process of associating sections performed by the candidate text/document associating means 23. In the example shown in FIG. 6, four document sections 601, 602, 603, 604 are extracted by the document section extracting means 42 with reference to line feed/null line information. The word in document section extracting means 43 extracts (information communication, speech recognition, semantic information, . . . ), (security, video camera, animal body, . . . ), (experiment, . . . ), (study, . . . ) in each of document sections 601, 602, 603, 604 as an important word.

On the other hand, the audio/image section extracting means 21 sets an audio/image section by audio/image analysis. In the example shown in FIG. 6, the audio/image section extracting means 21 extracts (13:41, 15:41), (15:41, 16:50), (16:50, 20:15), (20:15, 21:13) . . . to be named audio sections 605, 606, 607, 608 by using silent sections. In each of the audio sections 605, 606, 607, 608, the means 41 extracts words such as (speech recognition, semantic information, . . . ), (information communication, semantic information, . . . ), (security, . . . ), (study, . . . ).

Basic words extracted by the means 41 and the means 43 may be merely nouns extracted from a candidate text or a document. With dictionary database registering important words, the means 41 and the 43 may extract words that match ones in the dictionary. The means 41 and the means 43 may determine a level of importance of a word by an analysis of frequency of word usage.

Based on similarity (redundant degree) of a word line, the candidate text section/document section associating means 44 may derive relationship between respective sections. For example, if similarity calculated by the means 45 exceeds a predetermined threshold, the means 44 may determine that the audio/image matches a document and derive relationship. As shown in FIG. 6, for the section which cannot be associated with, the means 43 may conclude that "association cannot be established".

In the example shown in FIG. 6, sections are associated by focusing on a redundant degree of a word included in each section, but association may be performed with appearance frequency of the entire words. For example, the relationship deriving means 50 may generate a histogram on all the words included in each section instead of extracting important words, and determine the appearance frequency of the entire words based on similarity of the histogram and decide the associated sections.

The means 44 may perform association by processing an effective calculation reusing the calculation result based on the dynamic programming matching system (DP matching system). In such a case, the means 44 establishes correlations by extracting relationship in the time order and calculating the accumulated relationship so that the total match is maximized. Deriving the audio/image section and deriving the document section are essentially equivalent even if they are performed in a method other than the method shown in the embodiment.

The width (extraction unit) of document section or audio/image section to be extracted may be in units of a word, several words, a sentence, several sentences or a chapter insofar as they are a collective unit. As the optimal value for a unit of section varies depend on accuracy of speech recognition or how a document is summarized, a user or a system administrator may set a unit of section according to the situation.

Figure 7:
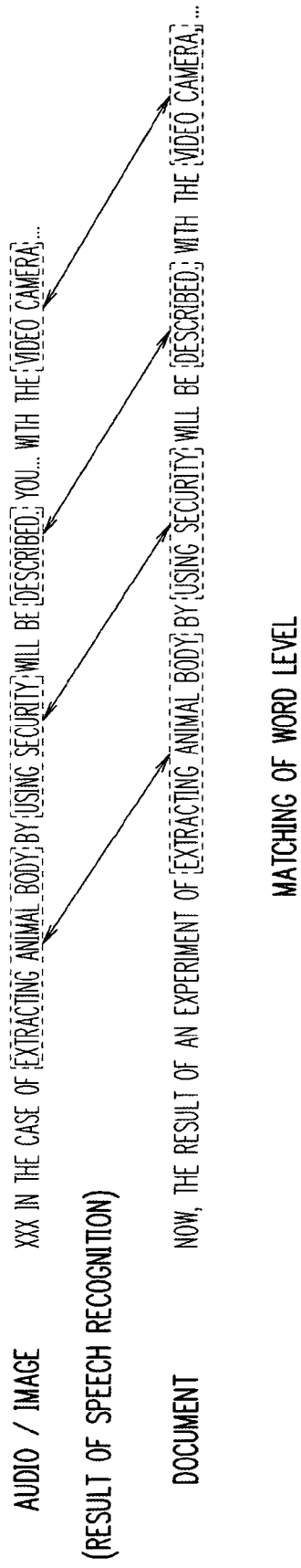
FIG. 7 is an illustration showing an example where association is performed by speech recognition match for associating an image or audio and a document.

FIG. 7 is an illustration showing an example where a candidate text and a document are associated with each other by speech recognition on a word level. In the example shown in FIG. 7, relationship is derived based on a word appearing in a candidate text for voices or images and a word appearing in a document. If a candidate text by speech recognition includes an error, the relationship deriving means 50 can correctly derive relationship based on a correctly recognized word. Such a method of deriving relationship based on a word level is appropriate for a document which must correctly describe remarks in a meeting, such as the minutes of statements at the Diet.

Figure 8:
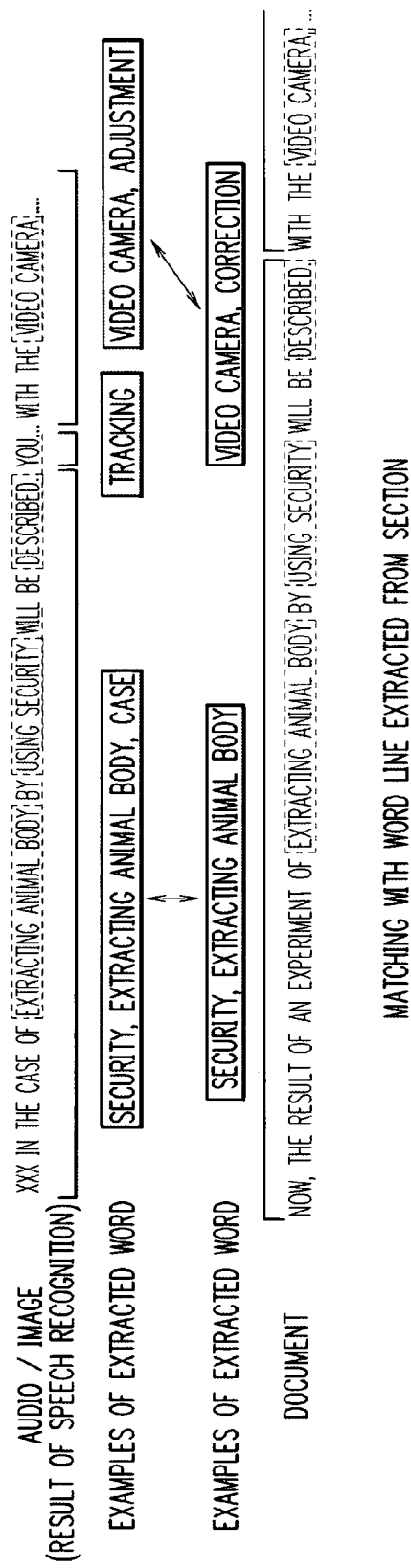
FIG. 8 is an illustration showing an example of associating by matching a level of word line used in a section for associating an image or audio and a document.

FIG. 8 is an illustration showing an example of associating a candidate text with a document on a level of word line (word group) extracted from each section. In the example shown in FIG. 8, the relationship deriving means 50 measures similarity (redundant degree of words or the like) between word lines extracted from each audio/image section and document section, and generates relationship for each section. In the example shown in FIG. 8, the relationship deriving means 50 determines that word lines (security, animal body extraction, case) and (security, animal body extraction) are associated with each other and word lines (video camera, adjustment) and (video camera, correction) are associated with each other. As a document section associated with an audio section (tracking) is not present, the relationship deriving means 50 deems the relationship as "not associated" for the audio section (tracking).

Such a method of deriving relationship on a level of word line is appropriate for a case where it is desirable to derive relationship between a summarized sentence and voices instead of correctly reflecting remarks in the actual event and present the relationship to a user. If documents on objective events are described in order of occurrence (time line information is stored) and the DP matching system is used for association between a document and voices, appropriate relationship can be derived even when isolated expressions are present.

In the above-mentioned example, although a candidate text is extracted from track audio data or input audio data by using speech recognition for audio data, an image may be converted into text through image recognition. For example, if image data includes an image of an automobile, "automobile" can be visually recognized and converted into text so as to match a basic word in a document.

When the relationship deriving means 50 derives relationship based on audio data or image data stored in the audio/image storage means 30 and document data stored in the document storage means 40, it generates correspondence table data (correspondence) in which voices or images and a document are corresponding with each other. Although the correspondence table data is automatically generated from the means 50, it is generated according to the proceedings drafted by a timekeeper, for example. The correspondence table data may be manually generated with an image editing device or interactively generated.

Figure 9:
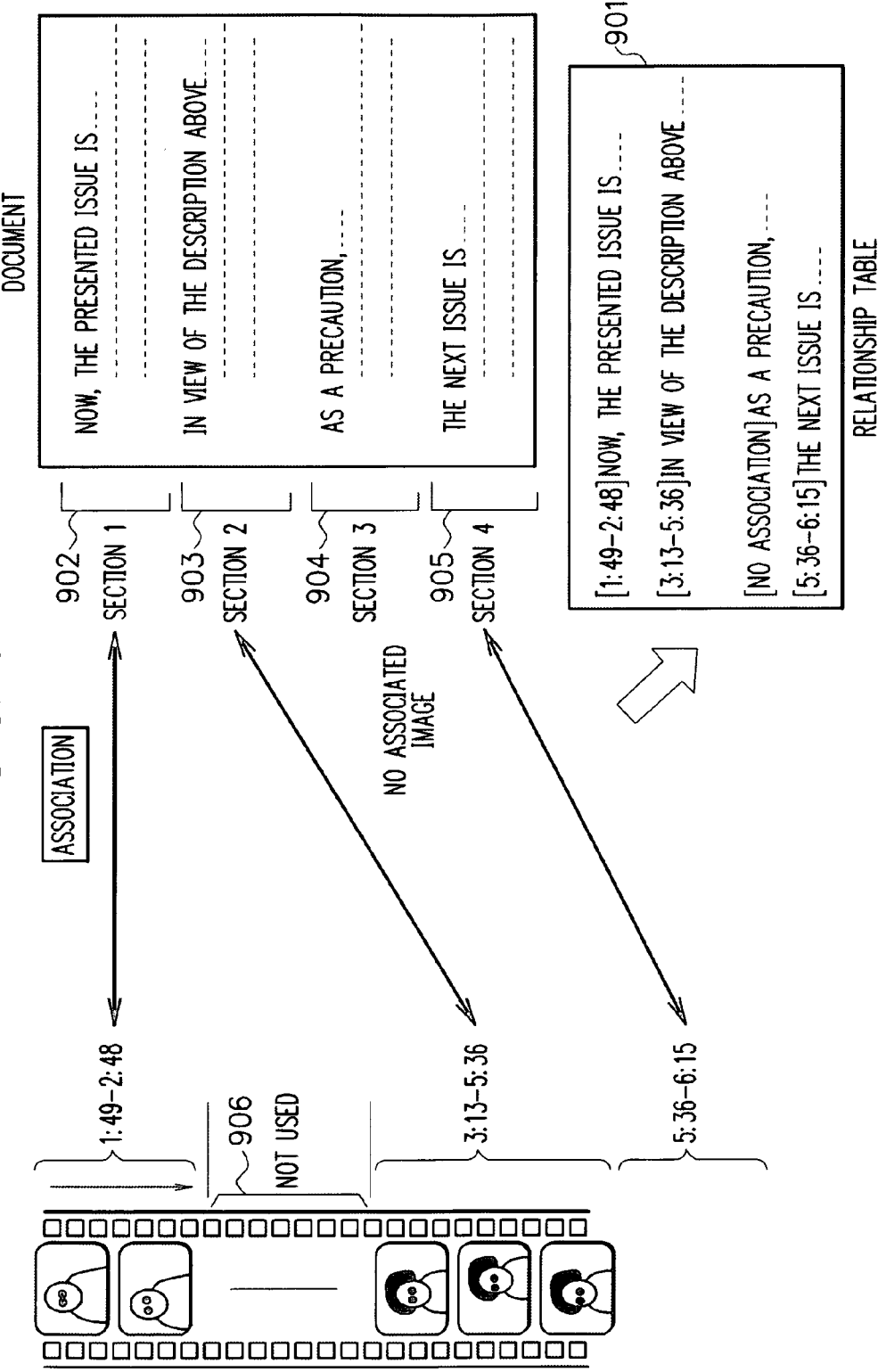
FIG. 9 is an illustration schematically showing an example of association between an image or audio and a document and correspondence table data.

FIG. 9 is an illustration showing an example of relationship derived by the means 50 and correspondence table data for presenting the relationship. As shown in FIG. 9, the means 50 generates a correspondence table data 901 based on relationship between derived voices/images and a document.

As shown in FIG. 9, when relationship between voices/images and a document is derived, voices/images may lack corresponding sections to document sections. For example, as shown in FIG. 9, no audio/image section associated with a document section 904 may exist. There may be no document section corresponding to an audio/image section. For example, as shown in FIG. 9, audio/image section 906 (2:48-3:13) which does not have any associated document section may be present. The relationship deriving means 50 generates correspondence table data 901 in the form of the time of "images or voices (starting time and ending time of a section): corresponding document", for example.

The relationship deriving means 50 may be adapted to correct correspondence table data according to operation of a user such as a person who creates the minutes of a meeting or a participant of a meeting (hereinafter simply referred to as user). FIG. 10 is a block diagram showing an example of an arrangement of the relationship deriving means 50 correcting correspondence table data according to user's operation. As shown in FIG. 10, the relationship deriving means 50 includes relationship analysis deriving means 61 for deriving relationship between voices/images and a document, relationship holding means 62 for storing correspondence table data, and relationship correcting means 63 for correcting correspondence table data.

The relationship analysis deriving means 61 derives relationship between voices/images and a document by analyzing audio data or image data and document data, and generates correspondence table data. The relationship analysis deriving means 61 includes, for example, the audio/image section extracting means 21, the speech recognition means 22, and the candidate text/document associating means 23. The relationship holding means 62 is a storage medium such as RAM, flash memory or a hard disk and stores correspondence table data generated by the relationship analysis deriving means 61.

The relationship correcting means 63 corrects correspondence table data stored in the relationship holding means 62 according to user's operation. For example, when a user wants to correct correspondence table data, the user operates the documentation browsing apparatus and inputs correction instructions about the correspondence table data. Then, the documentation browsing apparatus displays an edit screen of the correspondence table data. The relationship correcting means 63 corrects the correspondence table data according to the user's operation.

The relationship presenting means 60 displays information on the result of relationship between voices/images and a document based on the correspondence table data generated by the relationship deriving means 50 (step S107). That is to say, the relationship between voices/images and a document is presented to the user.

For example, when relationship between voices/images and a document is derived, a person who creates the minutes of a meeting checks/corrects the contents of the proceedings based on the relationship. The person who creates the minutes of a meeting may inform each of the participants by E-mail that the minutes of the meeting has been completed. When each of the participants wants to check the contents of the proceedings, the participant operates the documentation browsing apparatus and inputs a request of displaying the minutes of the meeting. Then, the relationship presenting means 60 displays information on the result of relationship between voices/images of the meeting and a document of the minutes of the meeting.

The documentation browsing apparatus may be connected to a terminal of each of the participants via a communication network such as LAN. The terminal of each of the participants may include the relationship presenting means 60. In such a case, each of the participants may operate his/her terminal and check information on the result via LAN or the like or correct correspondence table data.

Figure 11:
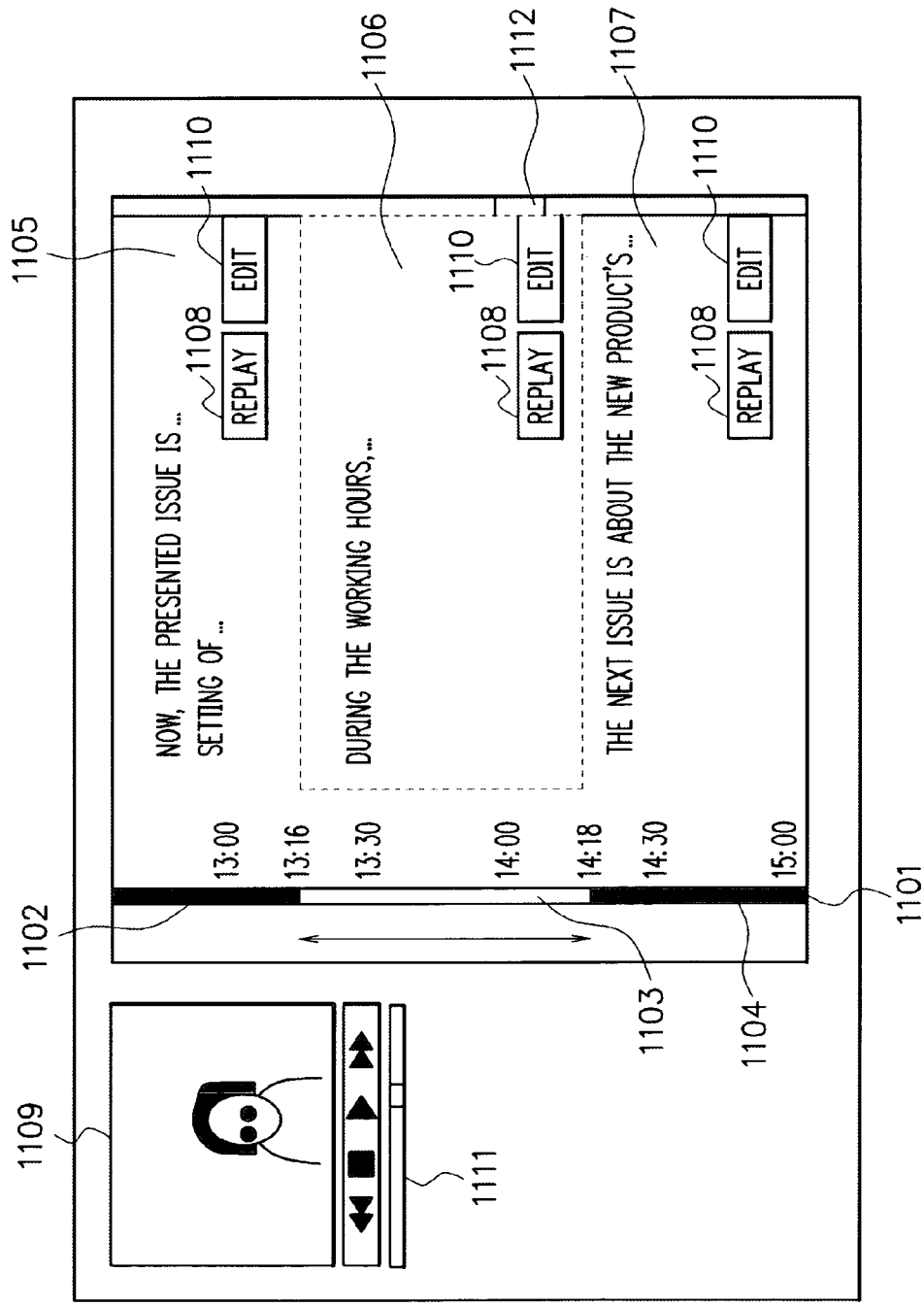
FIG. 11 is an illustration showing an example of a relationship display screen between voices/images and a document.

FIG. 11 is an illustration showing an example of a relationship display screen showing relationship between voices/images and a document displayed by the relationship presenting means 60. In this example, a case where a relationship display screen is displayed based on the correspondence table data shown in FIG. 9 will be described. As shown in FIG. 11, the relationship display screen includes a time axis bar 1101 with an ordinate indicating time information showing elapsed time of an image and audio. As shown in FIG. 11, the relationship display screen represents starting time/ending time/duration of a section by displaying each part of the time axis bar 1101 with different color for each of audio/image sections 1102, 1103 and 1104. For example, in FIG. 11, a section 1103 of "13:16-14:18" is displayed in the same color in the same section on the time axis bar 1101. The color of the section 1103 is displayed in different color from those of adjacent sections 1102 and 1104, respectively.

Characters of a document corresponding to each of the sections 1102, 1103 and 1104 are also displayed by different colors as they are displayed on the time axis 1101. The characters are displayed in document displaying sections 1105, 1106 and 1107 in association with each of the audio/image sections 1102, 1103 and 1104.

Each of the document display sections 1105, 1106 and 1107 includes a playback button 1108 for playing back voices or images. The relationship display screen includes an image screen 1109 for playing back and displaying an image. When a user clicks on the playback button 1108, voices of the associated section are played back and the image is played back and displayed on the image screen 1109.

Each of the document displaying sections 1105, 1106, 1107 includes an editing button 1110 for editing a displayed document. When a user clicks on the editing button 1110, an editing screen displaying the contents of a document of the associated section is displayed. Then, the user can create, add, adjust or delete the document.

As shown in FIG. 11, the relationship display screen includes an image slide bar 1111 under the image screen 1109 for scrolling an image. The relationship display screen also includes a character slide bar 1112 for scrolling character information displayed on the document displaying sections 1105, 1106 and 1107. For example, the user can maneuver the image slide bar 1111 and the character slide bar 1112 together to playback an image or display a document freely in a particular section.

Figure 12:
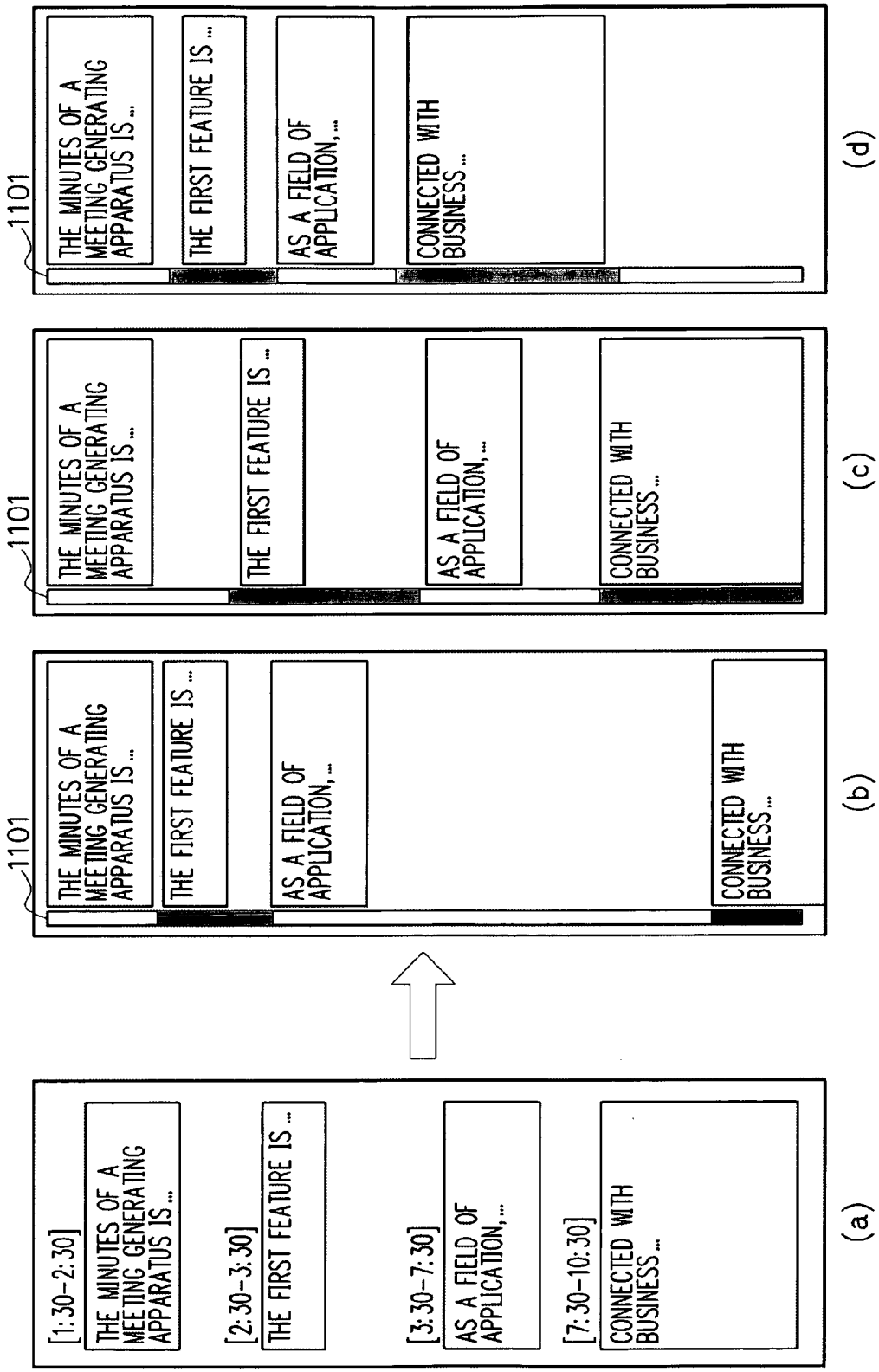
FIG. 12 is an illustration showing another example of a method for displaying a time axis for displaying a document and an associated image.

FIG. 12 is an illustration showing another example of a method for displaying a time axis for displaying a document and an associated image on the relationship display screen. In this example, a case where a time axis is displayed based on correspondence table data shown in FIG. 12 (a) will be described. FIG. 12 (b) shows a case where a length of a section on the time axis bar 1101 for each image (audio)/document section in proportion to an image (audio) time. That is to say, in FIG. 12 (b), the length of displaying a section is decided in proportion to the length of the image (audio) time. By displaying the length in proportion to the time information, the user can intuitively recognize and understand the time spent for each item in a meeting.

FIG. 12 (c) shows a case where a length of a section on the time axis bar 1101 of each section is fixed by the predetermined equal length. The user can intuitively recognize the number of image (audio)/document sections or the number of all sections displayed on the screen with the length fixed. FIG. 12 (d) is an example where the length of a section on the time axis bar 1101 is in proportion to the amount of document created. By making the length in proportion to the amount of document, the embodiment can increase the display density to display a document. The user can efficiently browse or create a document.

If each section is too small for displaying a document at a time, each section may be displayed in a box including a scroll bar. The embodiment enables a user to browse the entire document by allowing the user to scroll a scroll bar for each section with a mouse. A method for displaying a time axis is not limited to ones described in the embodiment. The present invention may be adapted to enable a user to decide as needed whether or not to display a time axis.

Figure 13:
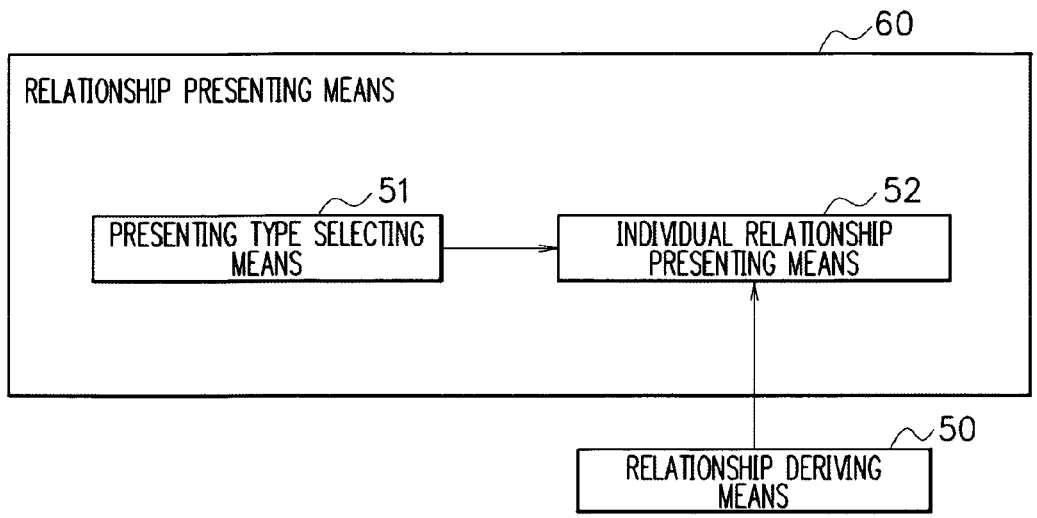
FIG. 13 is a block diagram showing an example of an arrangement of the relationship presenting means 60.

FIG. 13 is a block diagram showing an example of an arrangement of the relationship presenting means 60 to allow a user to select a method for displaying a time axis. As shown in FIG. 13, the relationship presenting means 60 includes a presenting type selecting means 51 for selecting a type of a time axis display (presentation) and an individual relationship presenting means 52 for presenting relationship between voices/images and a document by displaying the relationship. The means 51 decides a size for an image/document section according to a selection instruction by a user. Then, the means 52 displays relationship according to the display size decided by the means 51. The displaying type selecting means is realized by the presenting type selecting means 51.

The relationship presenting means 60 may be adapted to detect that no associated section is present as inconformity when correspondence table data includes an audio/image section with no associated document section or when the correspondence table data includes a document section with no associated audio/image section.

Figure 14:
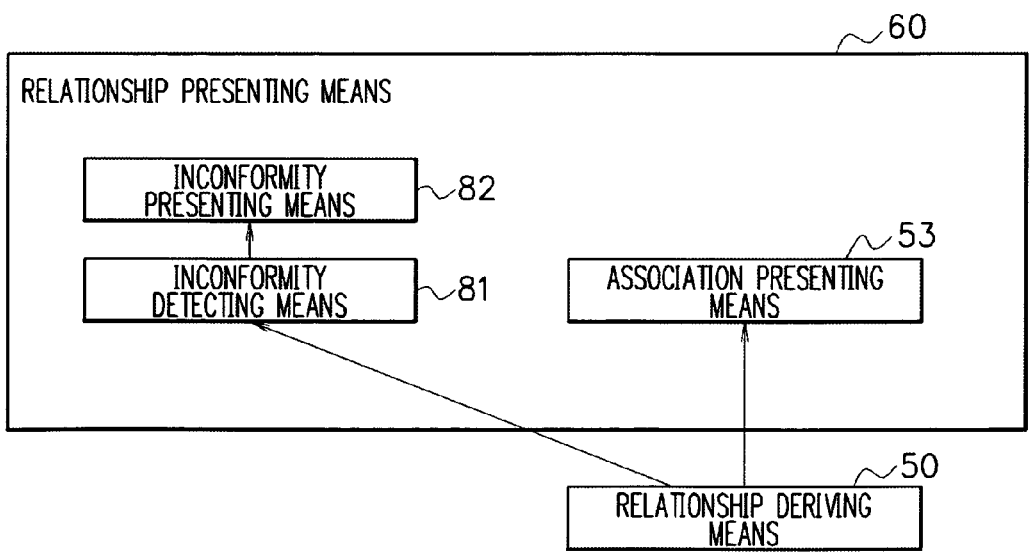
FIG. 14 is a block diagram showing an example of an arrangement of the relationship presenting means 60.

FIG. 14 is a block diagram showing an example of an arrangement of the relationship presenting means 60 when it detects inconformity. As shown in FIG. 14, the relationship presenting means 60 includes inconformity detecting means 81 for detecting inconformity of sections, inconformity presenting means 82 for displaying and presenting inconformity, and association presenting means 53 for displaying and presenting relationship between voices/images and a document, when the relationship presenting means 60 performs inconformity detection.

When correspondence table data includes an audio/image section with no associated document or when the correspondence table data includes a document section with no associated audio/image section, the inconformity detecting means 81 detects inconformity. When the inconformity detecting means 81 detects inconformity, the inconformity presenting means 82 displays that inconformity is detected. The association presenting means 53 displays relationship between voices/images and a document based on correspondence table data. The association presenting means 53 includes, for example, the presenting type selecting means 51 and the individual relationship presenting means 52. The inconformity displaying means is realized by the inconformity presenting means 82.

The relationship presenting means 60 may be adapted to display a relationship table screen including information on a speech recognition result performed at the relationship derivation. FIG. 15 is an illustration showing another example of a relationship display screen displayed by the relationship presenting means 60. As shown in FIG. 15, the relationship table screen displays information on a speech recognition result performed at the relationship derivation and the contents of the corresponding documents.

The embodiment enables a user to easily recognize the contents of a meeting even when the contents of a meeting have no description of a document associated with voices/images. For example, in FIG. 15, a user can easily recognize the contents of the meeting by checking the contents of information of a speech recognition result "therefore," even when any description of an associated document for a part 1501 "therefore" in the information of the speech recognition result is not present. The user can easily recognize the contents of the meeting. The user can easily recognize how a document is made for the actual dialog by displaying the speech recognition result.

The relationship presenting means 60 may be adapted to display a relationship table screen including a basic word extracted from speech recognition result. FIG. 16 is an illustration showing yet another example of a relationship display screen displayed by the relationship presenting means 60. As shown in FIG. 16, the relationship table screen displays the extracted basic word (in the embodiment, "minutes of a meeting creating apparatus" or "relationship") as well as the contents of the associated document is displayed in association with each of the contents of the document. The user can immediately recognize the contents described in each section with the basic word displayed or presented. That is to say, the basic word plays a role of a keyword for a user to recognize the described contents.

When the user checks the relationship display screen and determines that the displayed relationship is wrong, the user operates the documentation browsing apparatus and inputs an adjustment instruction of relationship. The relationship presenting means 60 determines whether a user inputs an adjustment instruction of relationship or not (step S108). When it is determined that an adjustment instruction is inputted, the relationship presenting means 60 adjusts and updates the contents of the correspondence table data according to operation of the user (step S109). Then, the relationship presenting means 60 displays a relationship display screen based on the updated correspondence table data (step S107).

When the user checks the relationship display screen and wants to playback voices or images associated with a document, the user operates a documentation browsing apparatus and inputs an instruction to playback voices/images. For example, the user inputs a playback instruction by clicking on the playback button 1108 on the relationship display screen.

If it is determined that an adjustment instruction is not inputted at step S108, the associated audio/image playback means 80 determines whether a user inputs an instruction to playback voices/images (step S110). If it is determined that an adjustment instruction is inputted, the associated audio/image playback means 80 plays back and displays voices/images associated with a section for which a playback instruction is issued (step S111).

When the user wants to edit the contents of a displayed document, the user operates the documentation browsing apparatus and inputs an instruction to edit the document. For example, the user inputs an editing instruction by clicking on the editing button 1110 on the relationship display screen.

If it is determined that a playback instruction is not inputted at step S110, the document editing means 70 determines whether a user inputs an editing instruction (step S112). If it is determined that an editing instruction is inputted, the document editing means 70 performs creation, addition, edition or deletion of a document according to operation of a user (step S113).

When the document editing means 70 edits a document, it extracts from the document storage means 40 only data corresponding to a section which is specified by the relationship presenting means 60 according to operation of a user among target document data. For example, when a user clicks on the editing button 1110 of a place where the user wants to edit on the relationship display screen, the document editing means 70 extracts from the document storage means 40 only data corresponding to a document section including the editing button 1110 on which the user clicked.

The document editing means 70 updates document data by editing a document included in the extracted data. For example, the user operates the documentation browsing apparatus and edits document data of a drafted minutes of a meeting stored in the document storage means 40 to complete the minutes of a meeting.

The document editing means 70 may be not only adapted to edit by extracting data including only a document of a part of an editing object in document data but also to adjust the entire document by extracting the entire document data. Each of the participants of a meeting may be allowed to operate a terminal of his/her own and edit correspondence table data or document data via a LAN and playback voices/images.

Although adjustment of relationship (step S109), playback of voices or images (step S111), and edition of a document (step S113) are performed in sequence in the embodiment, whole the process can be performed in parallel.

If the user edits a document and wants to have relationship between voices/images and a document recalculated, the user operates the documentation browsing apparatus and inputs an instruction to recalculate the relationship. If it is determined that an editing instruction is not inputted at step S112, the relationship updating indicating means 100 determines whether a user inputs a recalculation instruction or not (step S114).

If it is determined that a recalculation instruction is inputted, the relationship updating indicating means 100 causes the relationship deriving means 50 to perform recalculation of derivation of relationship between voices/images and a document. Then, the documentation browsing apparatus repeatedly performs the process from step S106 to step S114.

In order to recalculate relationship after editing the document, the relationship deriving means 50 may create another relationship and the relationship presenting means 60 may update the relationship display screen according to an instruction inputted from the user. Or, the documentation browsing apparatus may automatically detect that document has been edited, and the relationship deriving means 50 may create relationship, and the relationship presenting means 60 may update the relationship display screen. When a user inputs an instruction or the completion of editing of a document is detected, the relationship updating indicating means 100 causes the relationship deriving means 50 to recalculate relationship. That is to say, the user can give instructions to derive relationship via the relationship updating indicating means 100.

The document editing state observing means 110 observes an editing state of a document. When the contents of the document is updated, the means 110 may cause the means 100 to perform the relationship updating process. Then, the user can derive relationship without issuing an instruction after the document is edited.

If it is determined that a recalculation instruction is not inputted at step S114, the outputting means 90 determines whether edition process of a document or the like is completed or not (step S115). If it is determined the editing process is completed, the outputting means 90 outputs a document based on document data accumulated in the document storage means 40 (step S116). For example, the outputting means 90 prints the minute of a meeting based on document data on the completed minutes of a meeting accumulated in the document storage means 40. If it is determined that the edition process is not completed at step S115, the documentation browsing apparatus repeatedly performs the process after step S107. The outputting means 90 may output a document according to operation of a user.

As mentioned above, according to the embodiment, relationship between voices or images and a document based on the voices or the images is derived and a relationship display screen with voices or images and documents being associated with each other is displayed and presented to the user. The user can edit a document by checking a relationship table screen and playing back only voices or images of a particular place needed to create a document. That makes user's documentation more effective.

When a plurality of users create a document, each user can playback and browse grounds for creating the document or voices or images associated with a particular place of a document. That facilitates all the users to immediately recognize the contents of the document so that a plurality of users' documentation can be made effective. Therefore, a document can be effectively created based on image data or audio data recorded at a meeting or a lecture. The person who creates the document or the participant of the meeting can browse a summarized document with voices or images so that a plurality of persons' documentation can be made effective.

According to the embodiment, when a user creates the minutes of a meeting, the user indicate to select a particular section of the document included in the minutes of the meeting so that the user can locate the start point of voices or images of a corresponding part. As the embodiment can display a place which cannot be used for creating the minutes of the meeting in recorded voices or a recorded image of a meeting and present it to the person who creates the minutes of the meeting, the person who creates the minutes of the meeting can effectively browse voices or images in a segment which is not described in the minutes of the meeting and edit the minutes of the meeting by effectively adjusting or updating the minutes of the meeting.

As the embodiment can display a place of the document which does not include associated voices or images and present them to the person who creates the minutes of the meeting, the person who creates the minutes of the meeting can easily edit the minutes of the meeting by adjusting or updating the minutes of the meeting. That can reduce cost for creating the minutes of the meeting. With this embodiment, participants of the meeting can easily check the contents of the minutes of the meeting.

Even if a lecture hall has poor conditions for collecting voices of a lecture, the embodiment can complement accuracy of speech recognition by matching words extracted from text or a document by speech recognition. Therefore, a user neither needs to have sophisticated speech recognition means nor to set an inputting device or an analysis device of voices for each of the participants of the meeting such as a sophisticated microphone to perform speech recognition. Therefore, the embodiment can reduce the size of the entire system for documentation and browsing, and also reduce an equipment cost.

Embodiment 2

Figure 17:
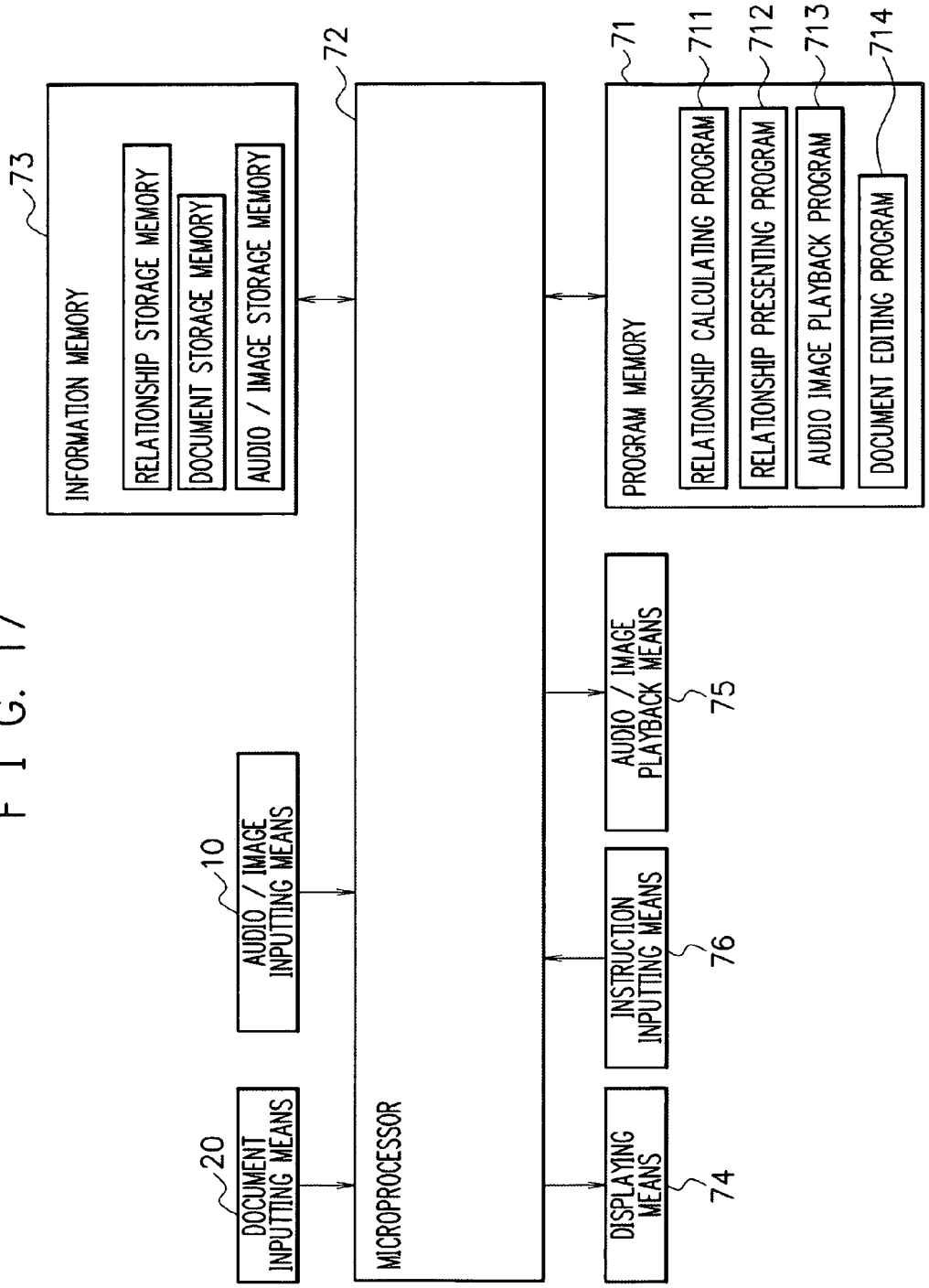
FIG. 17 is a block diagram showing another example of an arrangement of the documentation browsing apparatus.

Now, the second embodiment of the present invention will be described with reference to drawings. In the embodiment, a case where the documentation browsing apparatus is realized by a software program will be particularly described. FIG. 17 is a block diagram showing another example of an arrangement of a documentation browsing apparatus. As shown in FIG. 17, the documentation browsing apparatus includes audio/image inputting means 10, document inputting means 20, program memory 71 for storing various programs for performing process of documentation or browsing a document, a microprocessor 72 for performing process according to a program stored in the program memory 71, information memory 73 for storing various types of data, displaying means 74 for displaying a document or the like, instruction inputting means 76 for a user to input various instructions, and audio/image playback means 75 for playing back voices or images.

The audio/image storage means 30 and the document storage means 40 in the first embodiment are realized by the information memory 73. The relationship deriving means 50, the relationship presenting means 60, the document editing means 70 and the associated audio/image playback means 80 are realized by the microprocessor 72 for performing process according to a program stored in the program memory 71, the displaying means 74, the audio/image playback means 75, the instruction inputting means 76 and the like. The arrangement and functions of the audio/image inputting means 10 and the document inputting means 20 are same as those of the first embodiment.

The microprocessor 72 extracts audio/image data and document data from the information memory 73 and derives relationship between voices/images and a document, according to a relationship deriving program 711 stored in the program memory 71. The microprocessor 72 stores generated correspondence table data in the information memory 73. The microprocessor 72 extracts correspondence table data from the information memory 73 and causes the displaying means 74 to display the relationship table display screen between voices/images and a document, according to a relationship presenting program 712 stored in the program memory 71.

When a user inputs a replay instruction of voices/images of a particular image from the instruction inputting means 76, the microprocessor 72 causes the audio/image playback means 75 to playback the voices/images according to the audio image playback program 713 stored in the program memory 71. The microprocessor 72 creates, deletes, updates or adjusts document data stored in the information memory 73 according to a document editing program 714 stored in the program memory 71. A type of deriving basic relationship, a presenting type, a type of playing back voices/images and a method for editing document data are same as those of the first embodiment.

Embodiment 3

Figure 18:
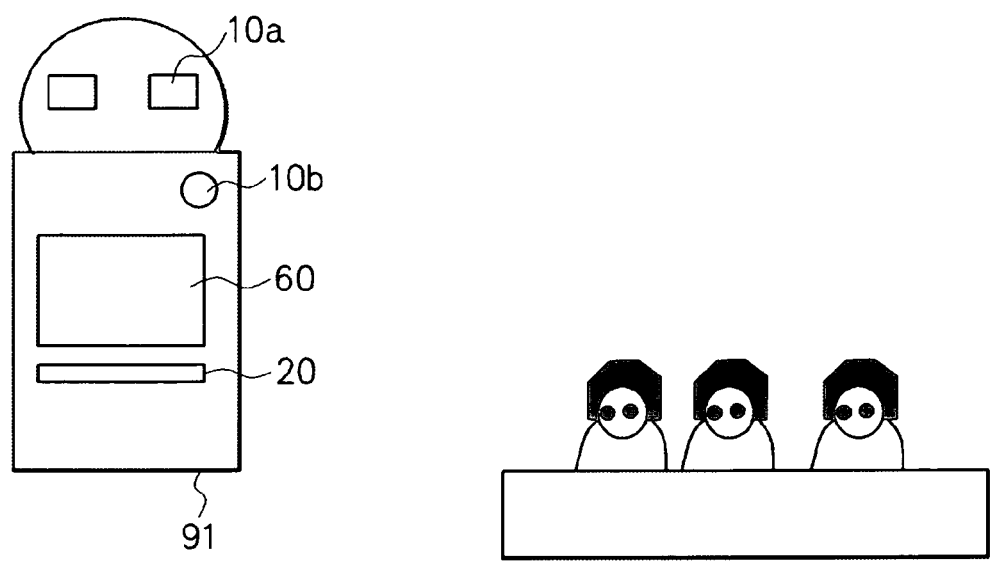
FIG. 18 is an illustration showing an example of a documentation browsing robot having the documentation browsing apparatus.

Now, the third embodiment of the present invention will be described with reference to drawings. In the embodiment, a case where documentation is performed by using a robot mounted with a documentation browsing apparatus will be described. FIG. 18 is an illustration showing an example of a documentation browsing robot having the documentation browsing apparatus.

As shown in FIG. 18, a robot 91 includes a camera 10a and a microphone 10b as audio/image inputting means 10 and document inputting means 20 such as a scanner. The camera 10a is image inputting means such as a video camera. The microphone 10b is audio inputting means such as a microphone. As shown in FIG. 18, the robot 91 includes the relationship presenting means 60 such as a display device.

The robot 91 is present at a meeting with the other participants of the meeting in the meeting room and shoots scenes of the meeting with the camera 10a, and records the contents of the meeting with the microphone 10b. For example, the robot 91 shoots scenes of the meeting by changing direction as it automatically rotates to a speaker.

The person who creates the minutes of the meeting operates the document inputting means 20 and inputs document data such as a drafted minutes of a meeting in the robot 91. The robot 91 has the audio/image storage means 30, the document storage means 40, the relationship deriving means 50 and the like. The robot 91 derives relationship between voices/images and a document by using functions of the relationship deriving means 50 and displays a relationship table screen on the relationship presenting means 60 based on generated correspondence table data.

When a user browses a presented screen and operates an operation unit (not shown) of the robot 91 to input a playback instruction for a part which the user wants to playback voices or images, the robot 91 plays back the voices or the images for the associated section. With the robot 91 including the above mentioned functions, the embodiment can generate or brows the minutes of a meeting by letting the robot 91 be present in each meeting room.

Although a case where the minutes of a meeting is generated is described in the embodiment, the documentation browsing robot can be adapted to usage other than creating the minutes of a meeting. For example, the documentation browsing robot can be adapted to all the usage such as to create or browse a document by using voices or images as it is or to create or browse by summarizing the voices or the images in the case of creating the minutes of a lecture or a lesson, in the case of generating diary or observations.

INDUSTRIAL APPLICABILITY

In the documentation browsing method according to the present invention, the documentation browsing apparatus derives relationship between voices/images and documents based on image data of scenes of a meeting shot or audio data of the contents of the meeting, and document data including a drafted proceeding created by a person who creates the minutes of a meeting. The documentation browsing apparatus displays and presents voices/images and a document being associated with each other to each of the participants of a meeting or a person who creates the minutes of a meeting. Therefore, the participants or the person who creates the minutes of a meeting can playback only voices or images of the necessary part, checks them and edits and completes the minutes of the meeting. As the documentation browsing apparatus can easily present voices/images and a drafted proceeding of a meeting which are associated with each other to all the participants of the meeting, it can make operation for a plurality of participants to create the minutes of a meeting more effective.

The invention claimed is:

1. Documentation browsing apparatus characterized by comprising:
   correspondence generating means for generating correspondence between voices or images included in audio data or image data and a document included in document data;
   association displaying means for displaying the voices or the images included in said audio data or said image data and a document included in said document data associated with each other based on said correspondence;
   document updating means for updating said document data based on user editing instruction; and
   matching means for establishing a matching between a document and sounds or images;
   wherein said correspondence generating means comprises:
   means for generating association information based on said matching established by said matching means;
   relationship recalculation instruction means for outputting recalculation instruction information for instructing recalculation of relationship between a document and voices or images and letting the matching means recalculate said relationship when said document data is updated.

2. The documentation browsing apparatus according to claim 1, wherein the correspondence generating means divides voices or images included in audio data or image data and a document included in document data into predetermined sections and generates correspondence between voices or images and a document for said each section; and
   wherein the document updating means generates, adds, corrects or deletes a document for said each section.

3. The documentation browsing apparatus according to claim 1, comprising playback means for playing back voices or images; where in the correspondence generating means divides voices or images included in audio data or image data and a document included in document data into predetermined sections and generates correspondence between voices or images and a document for said each section; and
   wherein the document updating means generates, adds, corrects or deletes a document for said each section; and
   wherein said playback means plays back voices or images of a part associated with at least one section included in said document data among voices or images included in said audio data or said image data.

4. The documentation browsing apparatus according to claim 1, wherein the document data includes a document of the minutes of a meeting or a lecture or a lesson, and the audio data or the image data includes voices or images of recorded contents of the meeting, the lecture or the lesson.

5. The documentation browsing apparatus according claim 1, wherein the correspondence generating means extracts a starting time and an ending time of a section of voices or images and generate association information which associates said starting time and said ending time with document data.

6. The documentation browsing apparatus according to claim 1, wherein the association displaying means displays time information which indicates the elapsed time of voices or images associated to each section of document data.

7. The documentation browsing apparatus according to claim 1, wherein the association displaying means displays a displaying location of a document included in document data on a display screen in association with time information which indicates an elapsed time of voices or images.

8. The documentation browsing apparatus according to claim 7, wherein the association displaying means displays the length of displaying each section of document data on a display screen by a length in proportion to the playback time of the sounds or the images associated with said each section.

9. The documentation browsing apparatus according to claim 7, wherein the association displaying means displays the length of displaying each section of document data on a display screen by a predetermined length.

10. The documentation browsing apparatus according to claim 7, wherein the association displaying means displays the length of displaying each section of document data on a display screen by a length in proportion to the amount of documents in documents associated with said each section.

11. The documentation browsing apparatus according to claim 7, comprising display type selection means for selecting a type of displaying the length of displaying each section of document data on a display screen;
   wherein said display type selection means selects a display type of a length in proportion to the playback time of the voices or the images associated with said each section, or a predetermined length, or a length in proportion to the amount of documents in documents associated with said each section according to a user's selecting instructions; and
   the association displaying means displays said each section according to the display type selected by said display type selection means.

12. The documentation browsing apparatus according to claim 7, wherein the association displaying means displays a time length of voices or images by a length of a display bar indicating a time axis on a display screen, and displays the time length of said voices or said images and characters in a document of a section associated with said voices or said images in the same color.

13. The documentation browsing apparatus according to claim 7, comprising:
    mismatch detecting means for detecting the case where voices or images and a document is not associated with each other as mismatch state of the sounds or the images and the document, and
    mismatch displaying that the voices or the images and the document mismatch when the mismatch is detected;
    wherein said mismatch displaying means displays that no section of documents associated with a section of voices or images exists or that no section of voices or images associated with a section of the document exists as a mismatch state.

14. The documentation browsing apparatus according to claim 1, comprising document storage means for storing document data and audio and image storage means for storing audio data or image data.

15. The documentation browsing apparatus according to claim 1, wherein the matching means establishes a matching between a document and voices or images by matching text generated by speech recognition or image recognition and a document included in document data.

16. The documentation browsing apparatus according to claim 15, wherein the matching means matches text and a document by using a dynamic program matching system with a word appearing in text or a document.

17. The document browsing apparatus according to claim 15, wherein the association displaying means displays text associated with said document among texts generated by the matching means in addition to a document included in the document data.

18. The documentation browsing apparatus according to claim 15, comprising basic word extracting means for extracting a basic word to be a basic unit for matching text and a document from words included in each section of said text and said document;
    wherein the matching means establishes a matching between a document and voices or images by calculating and comparing similarities between groups of basic words, which are sets of the basic words extracted by said basic word extracting means.

19. The documentation browsing apparatus according to claim 18, wherein the matching means matches text and a document by using a dynamic program matching system based on a group of basic words including basic words extracted by the basic word extracting means.

20. The documentation browsing apparatus according to claim 18, wherein the association displaying means displays a basic word associated with a document among basic words extracted by the basic word extracting means in addition to said document included in the document data.

21. The documentation browsing apparatus according to claim 1, wherein the matching means comprises relationship correction means for correcting the extracted relationship according to user's operation.

22. The documentation browsing apparatus according to claim 1, comprising the document update determination means for determining whether the document updating means updates document data or not; wherein the relationship recalculation means outputs recalculation instruction information and causes the relationship extraction means to recalculate relationship when the document data is determined to be updated.

23. The documentation browsing apparatus according to claim 1, comprising outputting means for outputting a document based on document data.

24. A documentation browsing robot comprising documentation browsing apparatus described in claim 1.

25. A documentation browsing program stored in a program memory characterized by causing a computer to execute the process of:
    generating correspondence between voices or images included in audio data or image data with a document included in document data;
    displaying the voices or the images included in said audio data or said image data and the document included in said document data associated with each other based on said correspondence; and
    updating said document data associated based on user editing instruction;
    displaying a displaying location of a document included in document data on a display screen in association with time information which indicates an elapsed time of voices or images; and
    outputting recalculation instruction information for instructing recalculation of relationship between a document and voices or images and recalculating said relationship when said document data is updated.

26. The documentation browsing program according to claim 25, causing a computer to execute the process of:
    dividing voices or images included in audio data or image data and a document included in document data for predetermined sections and generating correspondence between voices or images and a document for said each section; and
    generating, adding, correcting or deleting a document for said each section.

27. The documentation browsing program according to claim 25, causing a computer to execute the process of
    dividing voices or images included in audio data or image data and a document included in document data for predetermined sections and generating correspondence between voices or images and a document for said each section; and
    generating, adding, correcting or deleting a document for said each section; and
    playing back voices or images of a part associated with at least a section included in said document data among voices or images included in said audio data or said image data.

28. The documentation browsing program according claim 25, causing a computer to execute the process based on document data including a document of the minutes of a meeting or a lecture or a lesson, and the audio data or the image data including voices or images of recorded contents of the meeting, the lecture or the lesson.

29. The documentation browsing program according to claim 25, causing a computer to execute the process of:
    extracting a starting time and an ending time of a section of voices or images and generating association information which associates said starting time and said ending time with document data.

30. The documentation browsing program according claim 25, causing a computer to execute the process of displaying time information which indicates elapsed time of voices or images associated to each section of document data.

31. The documentation browsing program according to claim 25, causing a computer to execute the process of displaying the length of displaying each section of a document data on a display screen by the length in proportion to the playback time of the voices or the images associated with said each section.

32. The documentation browsing program according to claim 25, causing a computer to execute the process of displaying the length of each section of document data on a display screen by a predetermined length.

33. The documentation browsing program according to claim 25, causing a computer to execute the process of displaying the length of each section of document data on a display screen by the length in proportion to the amount of documents in documents associated with said each section.

34. The documentation browsing program according to claim 25, causing a computer to execute the process of:
    selecting a display type as display type of a length of document data on a display screen of each section from displaying a length in proportion to the playback time of the sounds or the images associated with said each section, or a predetermined length, or a length in proportion to the amount of documents in documents associated with said each section according to a user's indication; and
    displaying said each section according to the selected display type.

35. The documentation browsing program according claim 25, causing a computer to execute the process of:
    displaying a time length of voices or images by a length of a display bar indicating a time axis on a display screen, and displaying the time length of said voices or said image and characters in a document of a section associated with said audio or said image in the same color.

36. The documentation browsing program according to claim 25, causing a computer to execute the process of:
    detecting the case where voices or images and a document is not associated with each other as a mismatch state of the voices or the images and the document, and
    displaying that no section of documents associated with a section of voices or images exists or that no section of voices or images associated with a section of the document exists as a mismatch state when said mismatch is detected.

37. The documentation browsing program according to claim 25, causing a computer to execute the process of:
    establishing a matching between a document and voices or images, and
    generating correspondence based on said extracted relationship.

38. The documentation browsing program according to claim 37, causing a computer to execute the process of:
    establishing a matching between a document and voices or images by matching text generated by speech recognition or image recognition and a document included in document data.

39. The documentation browsing program according to claim 28, causing a computer to execute the process of:
    matching text and a document by using a dynamic program matching system with a word appearing in text or a document.

40. The documentation browsing program according to claim 38, causing a computer to execute the process of displaying text associated with a document in generated text in addition to said document included in the document data.

41. The documentation browsing program according to claim 38, causing a computer to execute the process of:
    extracting a basic word to be a basic unit for matching text and a document from words included in each section of said text and said document, and
    establishing a matching between a document and voices or images by calculating and comparing similarities between groups of the basic words, which are sets of the extracted basic words.

42. The documentation browsing program according to claim 41, causing a computer to execute the process of matching text and a document by using a dynamic program matching system based on a group of the basic words including the extracted basic words.

43. The documentation browsing program according to claim 41, causing a computer to execute the process of displaying a basic word associated with said document among the extracted basic words in addition to a document included in the document data.

44. The documentation browsing program according to claim 25, causing a computer to execute the process of:
    causing document storage means for storing document data to store document data generated based on a document inputted by a user; and
    causing audio and image storage means for storing audio data or image data to store audio data or image data generated with recorded dialogs.

45. The documentation browsing program according claim 25, causing a computer to execute the process of correcting the extracted relationship according to user's operation.

46. The documentation browsing program according to claim 25, causing a computer to execute the process of:
    determining whether document data is updated or not; and
    outputting recalculation instruction information and recalculating relationship when the document data is determined to be updated.

47. The documentation browsing program according to claim 25, causing a computer to execute the process of outputting a document based on document data.

* * * * *